United States Patent
Kawashima et al.

(10) Patent No.: US 11,734,810 B2
(45) Date of Patent: Aug. 22, 2023

(54) LASER SYSTEM, LEARNING DEVICE, AND INFERENCE DEVICE

(71) Applicant: Mitsubishi Electric Corporation, Tokyo (JP)

(72) Inventors: Takuya Kawashima, Tokyo (JP); Sei Ebihara, Tokyo (JP); Tatsuya Yamamoto, Tokyo (JP); Masashi Naruse, Tokyo (JP); Ken Hamachiyo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/008,740

(22) PCT Filed: Jul. 15, 2020

(86) PCT No.: PCT/JP2020/027499
§ 371 (c)(1),
(2) Date: Dec. 7, 2022

(87) PCT Pub. No.: WO2022/013970
PCT Pub. Date: Jan. 20, 2022

(65) Prior Publication Data
US 2023/0196538 A1      Jun. 22, 2023

(51) Int. Cl.
*G06K 9/00* (2022.01)
*G06T 7/00* (2017.01)
(Continued)

(52) U.S. Cl.
CPC ....... *G06T 7/0002* (2013.01); *G01N 21/8851* (2013.01); *G01N 21/958* (2013.01);
(Continued)

(58) Field of Classification Search
CPC .......... G06T 7/0002; G06T 7/62; G06T 7/70; G06T 2207/20081; G06T 2207/20084;
(Continued)

(56) References Cited

U.S. PATENT DOCUMENTS

2018/0109065 A1    4/2018    Sasaki et al.

FOREIGN PATENT DOCUMENTS

| JP | H01-117380 A | 5/1989 |
| JP | H06-350179 A | 12/1994 |

(Continued)

OTHER PUBLICATIONS

Dong, Lizhi, et al. "Automatic online laser resonator alignment based on machine vision: analysis." Automated Visual Inspection and Machine Vision. vol. 9530. SPIE, 2015. (Year: 2015).*

(Continued)

*Primary Examiner* — Jonathan S Lee
(74) *Attorney, Agent, or Firm* — Xsensus LLP

(57) ABSTRACT

A laser system for amplifying laser light generated from a laser light source and emitting the laser light includes an optical element in an optical path of the laser light and transmits the laser light, a control device to control power to be supplied to the laser system, an imager to capture an image of the optical element, and an image processing circuitry to process the image of the optical element captured by the imager. The image processing circuitry in which reference images of the optical element corresponding to power information relating to the power are prepared in advance includes a comparison unit to compare a captured image of the optical element captured by the imager with a reference image selected by a reference image selection unit, the reference image corresponding to the power information at a time of image capturing by the imager.

20 Claims, 20 Drawing Sheets

(51) Int. Cl.
*G06T 7/70* (2017.01)
*G06T 7/62* (2017.01)
*G01N 21/958* (2006.01)
*G01N 21/88* (2006.01)
*H01S 3/097* (2006.01)
*H01S 3/034* (2006.01)
*H01S 3/036* (2006.01)
*H01S 3/038* (2006.01)

(52) U.S. Cl.
CPC .............. *G06T 7/62* (2017.01); *G06T 7/70* (2017.01); *H01S 3/097* (2013.01); *G06T 2207/20081* (2013.01); *G06T 2207/20084* (2013.01); *H01S 3/034* (2013.01); *H01S 3/036* (2013.01); *H01S 3/038* (2013.01)

(58) Field of Classification Search
CPC .. G01N 21/8851; G01N 21/958; H01S 3/987; H01S 3/034; H01S 3/036; H01S 3/038
USPC ......................................................... 382/155
See application file for complete search history.

(56) References Cited

FOREIGN PATENT DOCUMENTS

| | | |
|---|---|---|
| JP | H08-306999 A | 11/1996 |
| JP | 2013-099783 A | 5/2013 |
| WO | 2017/006418 A1 | 1/2017 |

OTHER PUBLICATIONS

International Search Report and Written Opinion dated Sep. 24, 2020, received for PCT Application PCT/JP2020/027499, filed on Jul. 15, 2020, 8 pages including English Translation.

* cited by examiner

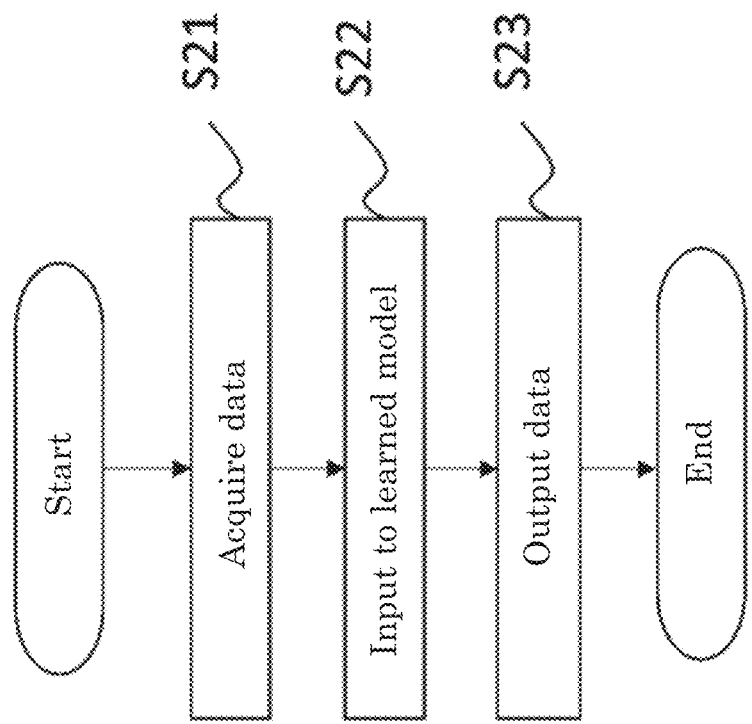

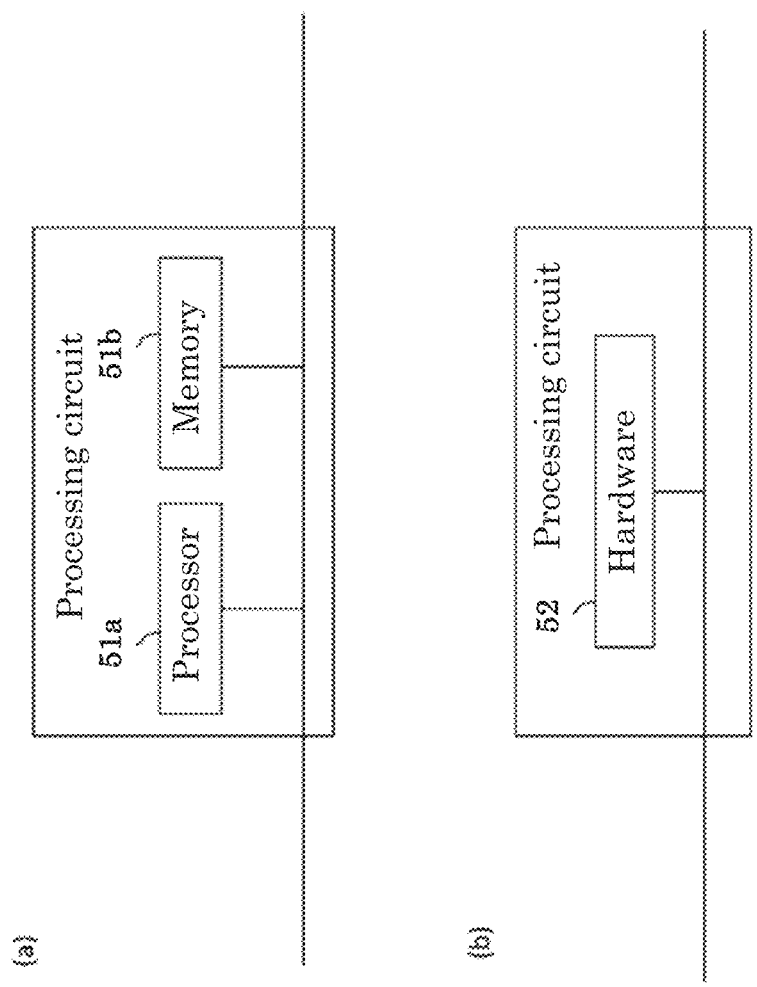

US 11,734,810 B2

LASER SYSTEM, LEARNING DEVICE, AND INFERENCE DEVICE

CROSS-REFERENCE TO RELATED APPLICATION

The present application is based on PCT filing PCT/JP2020/027499, filed Jul. 15, 2020, the entire contents of which are incorporated herein by reference.

TECHNICAL FIELD

The present disclosure relates to a laser system, a learning device, and an inference device.

BACKGROUND ART

There is a laser system such as a laser amplifier that emits laser light through a transparent window member, which is an optical member. For example, the transparent window member is provided in a chamber in which a gas medium serving as a laser medium is sealed and is used for taking out the amplified laser light to the outside.

Since a high-power laser light is transmitted through the transparent window member during operation of the laser system, damage may occur to the base material constituting the transparent window member and a coating on the surface of the transparent window member. As a result, the optical energy of the laser light emitted through the transparent window member changes, which may interfere with the operation of the laser system. In order to detect such damage of the transparent window member, there is a method in which the transparent window member is irradiated with reference light from a reference light source, the reference light passing through the transparent window member is imaged using an imaging device, and a change in optical properties of the transparent window member is measured using the measurement image captured by the imaging device (see, for example, Patent Document 1 below).

CITATION LIST

Patent Document

Patent Document 1: Japanese Unexamined Patent Application Publication No. H6-350179

SUMMARY OF INVENTION

Problems to be Solved by Invention

During operation of the laser system, discharge radiation light is generated when the laser medium is excited. For example, in some cases, peripheral light of laser light such as the discharge radiation light may have a broad wavelength spectrum. In such a case, if the peripheral light of the laser light has a spectral component of the same wavelength as the laser light, there is a possibility that the peripheral light of the laser light passes through the transparent window member. When the peripheral light passes through the transparent window member, it is noise at the time of imaging the transparent window member and affects the image thereof, resulting in a problem that accurate imaging is difficult. Further, since the discharge radiation light is increased or decreased in its generation by the increase or decrease of electric power supplied to the laser system, the influence of the peripheral light on the image is changed by the increase or decrease of the power. Therefore, it is necessary to cope with such a phenomenon in order to appropriately detect the damage of the transparent window member.

However, in the laser system disclosed in Patent Document 1, a reference image of a transparent window member without damage is stored in advance, and a change in optical properties of the transparent window member is detected by comparing the reference image with the measurement image taken by an imaging device, but accurate imaging cannot be performed due to the influence of peripheral light of the laser light caused by an increase or decrease in power supplied to the laser system on imaging, and damage to the transparent window member cannot be appropriately detected.

The present disclosure has been made in view of the above, and an object of the present disclosure is to provide a laser system capable of appropriately detecting damage to an optical member by performing processing for reducing the influence of peripheral light of a laser light on imaging even under various power supply conditions.

Means for Solving Problems

A laser system according to the present disclosure for amplifying laser light generated from a laser light source and emitting the laser light comprises an optical member that is provided in an optical path of the laser light and transmits the laser light, a control device to control power to be supplied to the laser system, an imaging device to capture an image of the optical member, and an image processing device to process the image of the optical member captured by the imaging device. The image processing device in which reference images of the optical member corresponding to power information relating to the power are prepared in advance includes a comparison unit to compare a captured image of the optical member captured by the imaging device with a reference image selected by a reference image selection unit, the reference image corresponding to the power information at a time of image capturing by the imaging device.

Effect of Invention

The laser system according to the present disclosure can reduce the influence of the peripheral light of the laser light on the imaging even under various power supply conditions and perform processing to appropriately detect the damage of the optical member.

BRIEF DESCRIPTION OF DRAWINGS

FIG. 19 is a flowchart showing a processing flow of the inference device according to Embodiment 6.

FIG. 20 is a diagram showing a configuration example of a processing circuit of the laser system according to Embodiment 1.

MODES FOR CARRYING OUT INVENTION

Figure 1:
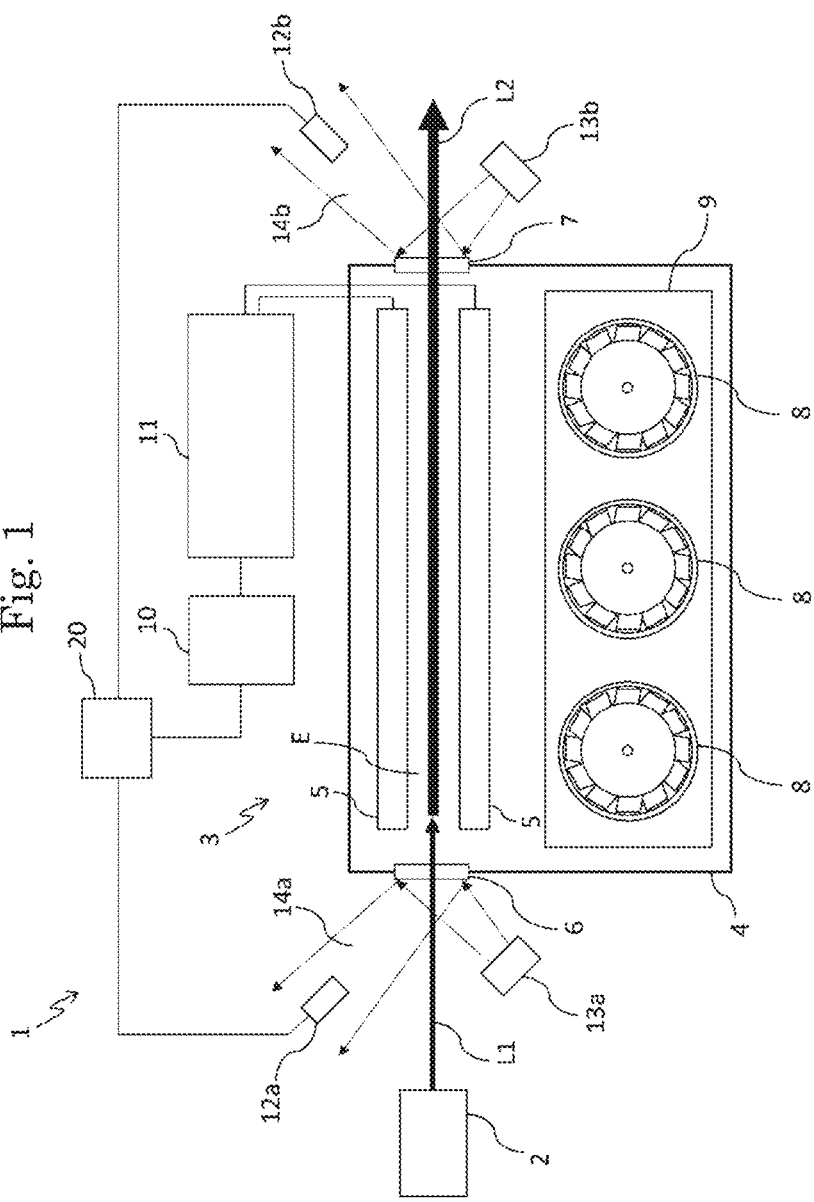
FIG. 1 is a block diagram showing a configuration of a laser system according to Embodiment 1.

Embodiments of the present disclosure will be described below with reference to the accompanying drawings. In each figure, the same or corresponding parts are denoted by the same reference numerals. The repetitive description will be simplified or omitted as appropriate. Note that the present disclosure is not limited to the following embodiments. In the drawings shown below, the scale of each of components may be different from the actual scale.

Embodiment 1

A laser system according to Embodiment 1 will be described below on the basis of a laser amplifier.

FIG. 1 is a block diagram of a laser system 1 according to Embodiment 1.

The laser system 1 shown in FIG. 1 includes a laser light source 2 and a laser amplifier 3. The laser light source 2 generates a seed laser light L1 to be brought into the laser amplifier 3.

Further, the laser system 1 includes two imaging devices 12a and 12b, two illuminating devices 13a and 13b corresponding to respective imaging devices, and an image processing device 20. The imaging devices 12a and 12b, the illuminating devices 13a and 13b, and the image processing device 20 will be described in detail later.

A laser amplifier 3 is provided with a chamber 4, a discharge electrode 5, an entrance window member 6, an exit window member 7, a laser gas circulation blower 8, a heat exchanger 9, a control device 10, and a power source 11. That is, the laser system 1 amplifies the laser light generated from the laser light source 2, by the discharging of the discharge electrode 5, and emits the laser light.

Although not shown, the laser system 1 is provided with a gas supply unit for filling the device with a laser gas, an exhaust unit having a vacuum pump for exhausting the laser gas, and a cooling device for cooling the discharge electrode 5, the entrance window member 6, the exit window member 7, the heat exchanger 9, and the like. Although not shown, the power source 11 is provided with a device for controlling the laser gas circulation blower 8 and a device for generating a discharge at the discharge electrode 5.

The chamber 4 is a housing, which is filled with a laser medium for amplifying the laser light. The laser medium is, for example, a laser gas that amplifies the laser light. The laser gas may be, for example, $CO_2$, $N_2$, He, or the like. The discharge electrode 5 for exciting the laser gas is provided in the chamber 4.

The discharge electrode 5 provided in the chamber 4 is applied with a high voltage at a high frequency on the basis of the power to be supplied to the laser amplifier 3. As a result, inter-electrode discharge E is generated at the discharge electrode 5. Excitation energy is given to the laser gas that exists between the discharge electrodes 5 by the inter-electrode discharge E. The discharge electrode 5 is arranged so as to generate the inter-electrode discharge E in an optical path of the laser light.

Further, the chamber 4 is provided with the entrance window member 6 for the seed laser light L1 generated from the laser light source 2 to be incident on, and the exit window member 7 for an amplified laser light L2 amplified by the inter-electrode discharge E inside the chamber 4 to be output. That is, the entrance window member 6 and the exit window member 7 (hereinafter, they may be referred to simply as "window member"), which are optical members in which the laser light is transmitted, are provided in the optical path of the laser light. The entrance window member 6 and the exit window member 7 are made of material that transmits the laser light, such as zinc selenide (ZnSe), for example. The chamber 4 is sealed by the entrance window member 6 and the exit window member 7.

The amplification of laser light will be briefly described. The laser gas is in an excited state when excitation energy is given by the inter-electrode discharge E. When the seed laser light L1 generated from the laser light source 2 passes through the entrance window member 6 and enters the chamber 4, the seed laser light L1 passes through the laser gas in the excited state between the electrodes of the discharge electrode 5. The seed laser light L1 is amplified by receiving energy from the laser gas to be the amplified laser light L2. The amplified laser light L2 passes through the exit window member 7 and is emitted from the chamber 4.

The chamber 4 is provided with the laser gas circulation blower 8 for circulating the laser gas and the heat exchanger 9 for cooling the laser gas.

The control device 10 is connected to the power source 11 of the laser amplifier 3 and controls the laser amplifier 3 through the power source 11. The power source 11 is connected to the discharge electrode 5 and supplies power according to a command value from the control device 10. That is, the control device 10 controls the electric power supplied to the discharge electrode 5. The command value of the electric power is, for example, a command value input by an operator of the laser system 1 or a command value input to the laser system 1 via an external device. Information relating to the electric power to be supplied to the discharge electrode 5 is called power information. The power information includes, for example, a value of the power to be supplied to the discharge electrode 5.

The imaging devices 12a and 12b are devices for capturing images of the optical members. The imaging devices 12a and 12b are used, for example, to capture images of the entrance window member 6 and the exit window member 7, which are optical members, when the laser system 1 is operated. The imaging devices 12a and 12b are provided for the entrance window member 6 and the exit window member 7, respectively. Imaging devices 12a and 12b capture images of the entrance window member 6 and the exit window member 7 according to a command inputted by an operator during operation of the laser system 1 or a command inputted to the laser system 1 via an external device.

The imaging devices 12a and 12b are provided at positions that do not interfere with the optical path of the laser light and at positions where the images of the entrance window member 6 and the exit window member 7, which are optical members, can be captured. The imaging devices 12a and 12b are provided at positions where they receive illumination light 14a and 14b from the illuminating devices 13a and 13b that illuminates the optical members to be captured. The imaging devices 12a and 12b are, for example, cameras provided with two-dimensional image sensors.

As shown in FIG. 1, an example of the arrangement of the imaging devices 12a and 12b is such that the imaging devices 12a and 12b are disposed at positions where the imaging devices 12a and 12b receive the illumination light 14a and 14b reflected by the optical members. Note that it is not necessary to use two imaging devices, and the number of imaging devices can be changed as appropriate. One imaging device may be used, or three or more imaging devices may be used. Further, the illuminating devices 13a and 13b may be used as needed and may not necessarily be installed.

Typically, since when amplified, the laser light has high output power, the optical member on the side from which the amplified laser light is emitted is likely to be damaged. Therefore, an imaging device for capturing at least the exit window member 7 may be installed.

Figure 2:
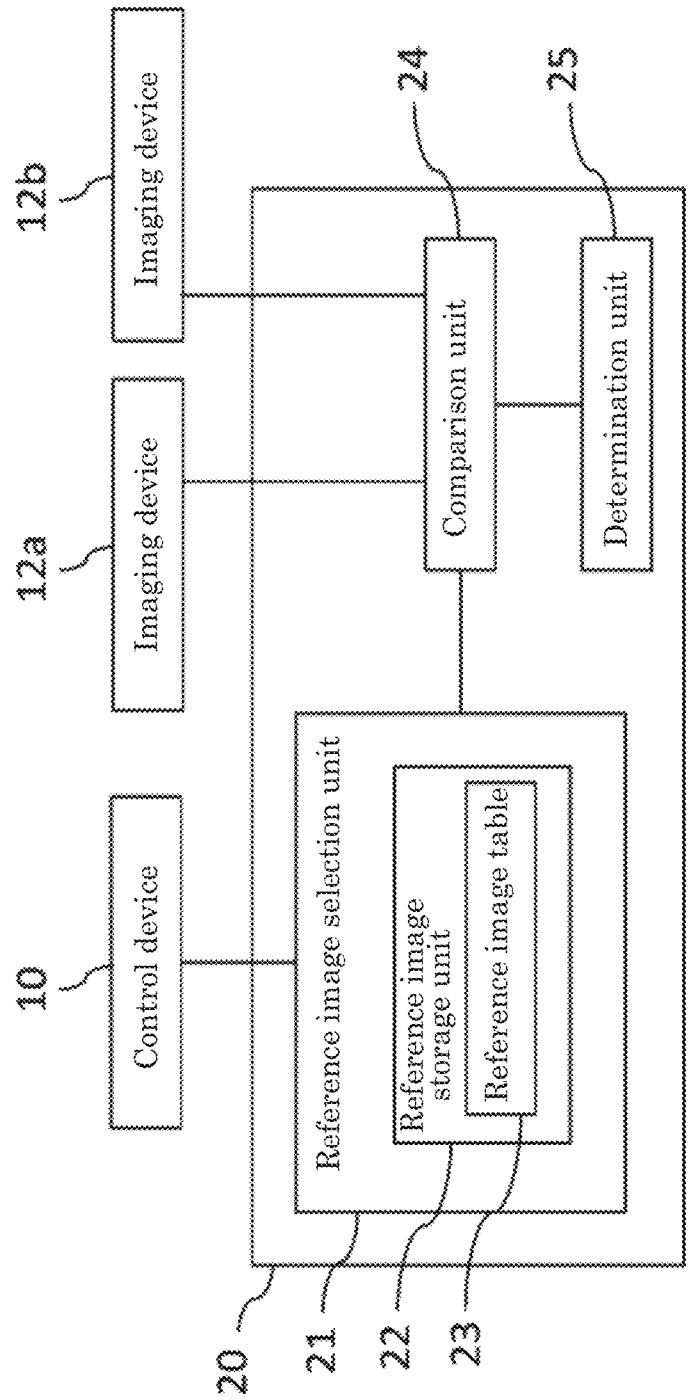
FIG. 2 is a block diagram showing a configuration of an image processing device of the laser system according to Embodiment 1.

Next, the image processing device 20 will be described with reference to FIG. 1 and FIG. 2. FIG. 2 is a configuration diagram of the image processing device 20, and peripheral devices connected to the image processing device 20 are also shown. As shown in FIG. 1 and FIG. 2, the image processing device 20 is connected to the control device 10 and the imaging devices 12a and 12b.

The image processing device 20 is a device for processing images of the optical members captured by the imaging devices 12a and 12b. The image processing device 20 processes images of the optical members depending on the number of imaging devices. The images of the optical members include, for example, images prepared in advance in the image processing device 20 and images captured by the imaging devices 12a and 12b when the laser system 1 is in operation. The image processing device 20 has a function of comparing the images prepared in advance in the image processing device 20 with the images captured by the imaging devices 12a and 12b during operation of the laser system 1 and detecting damage to the optical members on the basis of the difference between the images.

As shown in FIG. 2, the image processing device 20 includes a reference image selection unit 21, a reference image storage unit 22, a comparison unit 24, and a determination unit 25. Note that the determination unit 25 is not necessarily provided. The reference image selection unit 21 is connected to the control device 10 and receives the power information from the control device 10. The power information is information indicating a value of power supplied to the discharge electrode 5 during operation of the laser system 1. Note that the power information may include information of time at which the control device 10 acquired the power information.

The reference image selection unit 21 includes the reference image storage unit 22. The reference image storage unit 22 stores information on reference images of the entrance window member 6 and the exit window member 7, which are the optical members. The reference image storage unit 22 stores, for example, information on the reference images in a form of a reference image table 23. The reference images are images obtained by capturing images of the optical members without damage during operation of the laser system 1. The reference images are images taken in correspondence with a plurality of pieces of power information. Further, the reference images are prepared in advance and stored in the reference image storage unit 22. That is, the reference images of the optical members corresponding to the power information relating to power to be supplied to the discharge electrode 5 are prepared in advance in the reference image selection unit 21. Note that the reference image storage unit 22 is provided in the reference image selection unit 21, but it is not a limitation, and may be provided in a function different from the reference image selection unit 21 or may be provided in an external device connected to the image processing device 20. This is also true in other embodiments.

Figure 3:
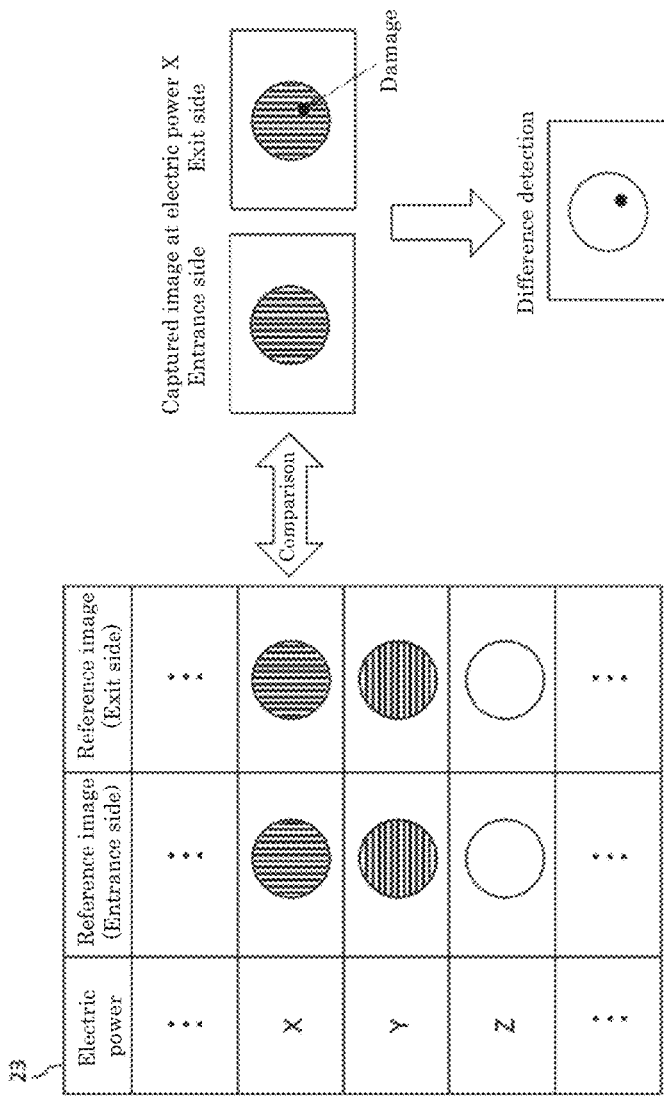
FIG. 3 is a conceptual diagram of a reference image table and image comparison according to Embodiment 1.

FIG. 3 shows an example of the reference image table 23. As shown in FIG. 3, the reference image table 23 has power information for the laser system 1 and information on the reference images of the optical members corresponding to the power information. In the reference image table 23, the reference images of the entrance window member 6 and the reference image of the exit window member 7 are stored for each value of the power such as power X, power Y, and power Z. Note that, if the number of the imaging devices is different, the reference images may be prepared in accordance with the imaging devices to be used.

When the reference image selection unit 21 receives power information from the control device 10 at a certain point in time when the laser system 1 is in operation, the reference image selection unit 21 searches for a reference image corresponding to the power information in the reference image table 23 and selects a reference image. When a reference image is selected, the reference image selection unit 21 outputs the reference image to the comparison unit 24. In this way, the comparison unit 24 receives information of a reference image from the reference image selection unit 21.

The comparison unit 24 is connected to the reference image selection unit 21. Further, the comparison unit 24 is connected to two imaging devices 12a and 12b. The comparison unit 24 compares the reference images input from the reference image selection unit 21 with the images of the optical members captured by the imaging devices 12a and 12b and detects damage. The comparison unit 24 compares the captured image captured by the imaging device 12a with the reference image of the entrance window member 6, and compares the captured image captured by the imaging device 12b with the reference image of the exit window member 7.

Referring back to FIG. 3, FIG. 3 shows images captured by the imaging devices 12a and 12b at power X. Images of damage portions as shown in the figure are captured as the images of the exit window member 7. As a result of comparing the images by the comparison unit 24, the damage is detected in the exit window member 7.

The reference image selection unit 21 selects from the reference image table 23 reference images corresponding to the power information at the time when the imaging devices 12a and 12b capture the images of the optical members. That is, since the power information at the time when the imaging devices 12a and 12b capture the images of the optical members may be different depending on the operating state of the laser system 1, and the reference image selection unit 21 is to select the reference image corresponding to the power information.

As described above, by using the reference image for each value of the power, the processing is performed such that the influence of the peripheral light of the laser light on the imaging is reduced even under various power supply conditions, and thus an effect is brought about in that the damage on the optical member can be appropriately detected.

The comparison unit 24 inputs difference information indicating the damage of the optical member detected by the comparison as a comparison result to the determination unit 25. Regarding the comparison of images performed by the comparison unit 24, for example, by comparing pixel information of an image from an imaging device is compared with pixel information of a reference image from the reference image selection unit 21. As a result, the difference information can be extracted as the pixel information. Alternatively, the comparison result may be input as area information from the extracted pixel information to the determination unit 25. The area information is, for example, an area value of damage calculated from the number of pixels contained in the extracted pixel information.

The determination unit 25 determines the damage of the optical member on the basis of the difference information indicating the damage detected by the comparison unit 24 through the comparison. For example, when the difference information exceeds a predetermined threshold value, the determination unit 25 determines that damage requiring treatment has occurred. When the difference information is equal to or less than the threshold value, it is determined that damage requiring treatment has not occurred.

As described above, since the determination unit 25 determines the damage on the basis of the result of the comparison performed by the comparison unit 24, it is possible to determine whether or not damage requiring treatment has occurred.

Figure 4:
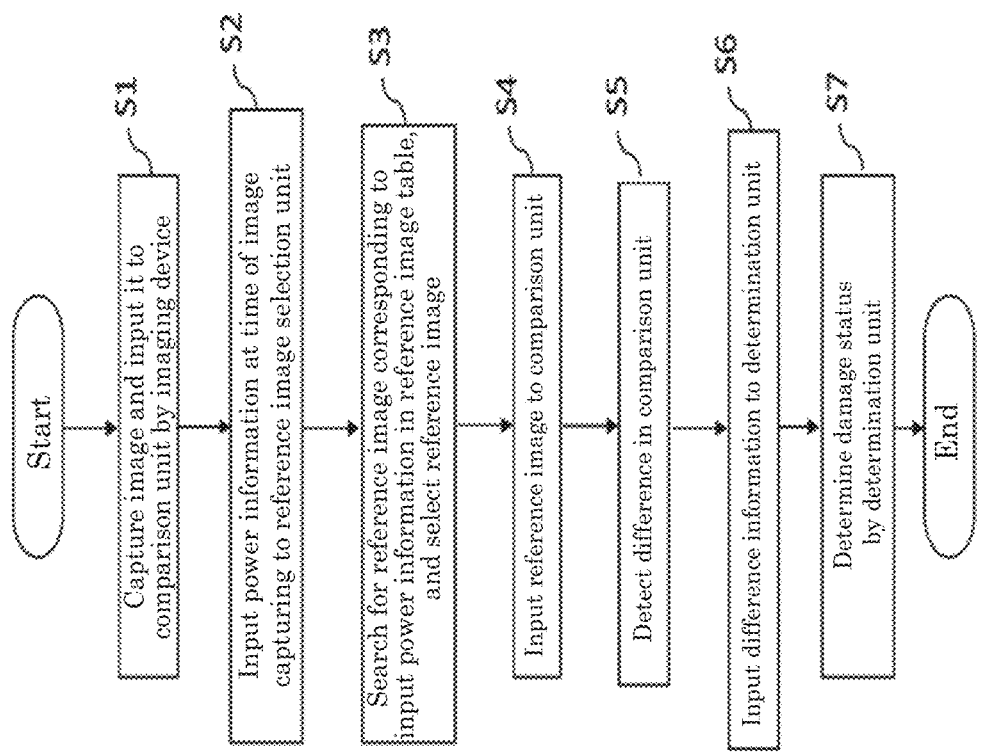
FIG. 4 is a flowchart showing a flow of operations of the laser system according to Embodiment 1.

Next, operations of the laser system 1 according to Embodiment 1 will be described with reference to FIG. 4. FIG. 4 is a flowchart showing an operation flow of the laser system 1.

In step S1, the imaging devices 12a and 12b capture images of the optical members and input the captured images of the optical member to the comparison unit 24. After the imaging devices 12a and 12b input the captured images to the comparison unit 24, the operation of step S2 is performed.

In step S2, the control device 10 inputs power information at the time when the imaging devices 12a and 12b captured the optical members to the reference image selection unit 21. After the reference image selection unit 21 receives the power information, the operation of step S3 is performed.

In step S3, the reference image selection unit 21 searches the reference image table 23 for a reference image corresponding to the input power information, and after the reference image is selected, the operation of step S4 is performed.

In step S4, the reference image selection unit 21 inputs the selected reference image to the comparison unit 24.

In step S5, the comparison unit 24 compares the reference image with the captured image and detects difference information. After the detection of the difference information, the comparison unit 24 performs the operation of step S6.

In step S6, the comparison unit 24 inputs the difference information to the determination unit 25. After the comparison unit 24 inputs the difference information to the determination unit 25, the operation of step S7 is performed.

In step S7, the determination unit 25 determines the damage of the optical member on the basis of the difference information indicating the damage of the optical member detected by the comparison unit through the comparison. After the determination unit 25 determines the damage of the optical member, a series of operations of the laser system 1 ends.

A laser system 1 according to Embodiment 1 is provided with the optical members which are provided in the optical path of laser light and in which the laser light is transmitted, a control device 10 for controlling the power supplied to the discharge electrode 5, the imaging devices 12a, 12b for capturing images of the optical members, and the image processing device 20 for processing the images of the optical members captured by the imaging devices 12a, 12b. The image processing device 20 includes the reference image selection unit 21 in which a reference image of the optical member corresponding to power information relating to the power is prepared in advance and which selects the reference image corresponding to the power information, and the comparison unit 24 for comparing an image of the optical member captured by the imaging device with the reference image selected by the reference image selection unit 21 as the reference image corresponding to the power information at the time of image capturing by the imaging device. Therefore, by using the reference image for each value of the power, the processing is performed such that the influence of the peripheral light of the laser light on the imaging is reduced even under various power supply conditions, and thus an effect is brought about in that the damage to the optical member can be appropriately detected.

Further, since the determination unit 25 for determining the damage of the optical member on the basis of the comparison result performed by the comparison unit 24 is provided, it is possible to determine whether or not damage requiring treatment has occurred.

Embodiment 2

Next, the laser system 1 according to Embodiment 2 will be described with reference to FIG. 5 to FIG. 7.

Figure 5:
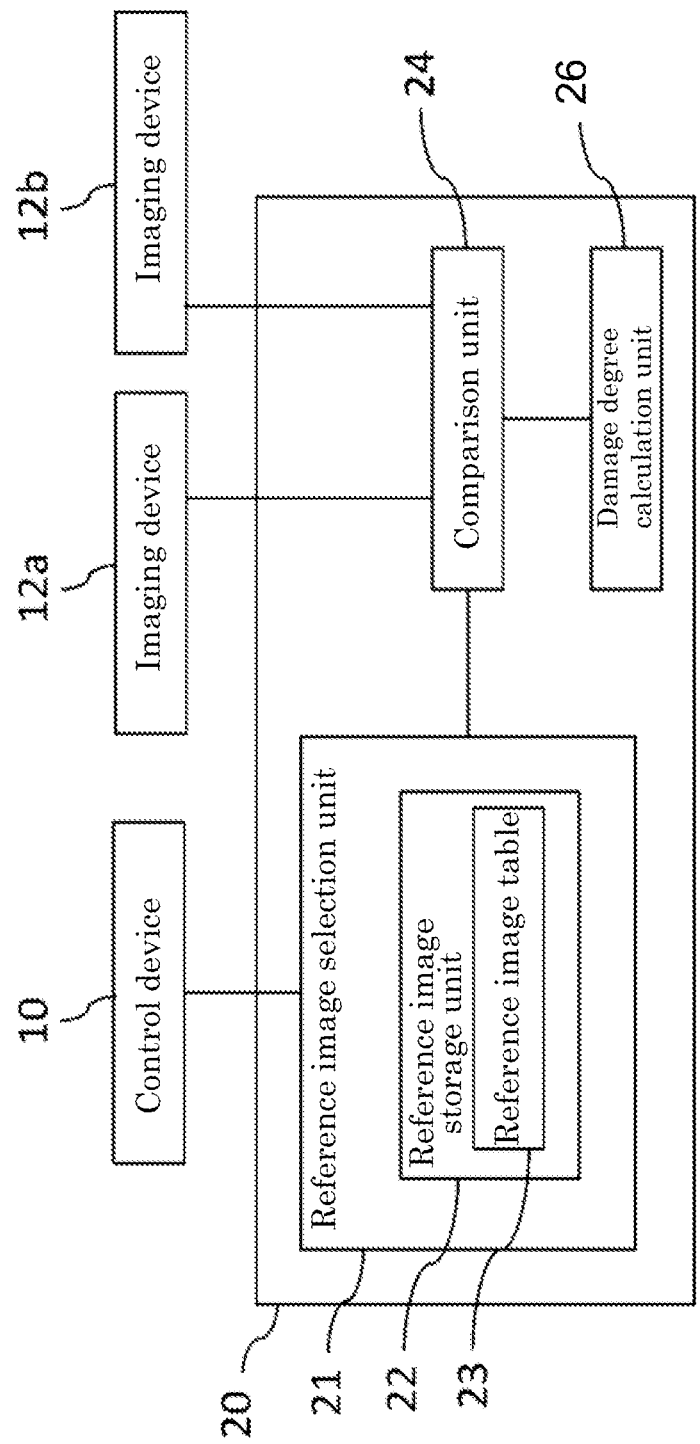
FIG. 5 is a block diagram showing a configuration of an image processing device of a laser system according to Embodiment 2.

FIG. 5 is a block diagram of an image processing device 20 of a laser system 1 according to Embodiment 2. As shown in FIG. 5, the image processing device 20 is different from the image processing device 20 according to Embodiment 1 in that it includes a damage degree calculation unit 26. Note that the configuration of the laser amplifier 3 is the same as that of Embodiment 1, and the same applies to the other embodiments below. In the following descriptions, a configuration different from that of Embodiment 1 will be mainly described.

The image processing device 20 according to Embodiment 2 is similar to Embodiment 1 in that a reference image is input to the comparison unit 24 from the reference image selection unit 21 and images captured by the imaging devices 12a and 12b are acquired, but differs in that the damage degree calculation unit 26 calculates a damage degree D on the basis of the comparison result of the comparison unit 24. The damage degree D is a value representing a degree of damage that occurs in an optical member due to laser light passing through the optical member.

Damage to the entrance window member 6 and the exit window member 7, which are optical members of the laser amplifier 3, affects the operation of the laser system 1 differently depending on the position where the damage occurs. For example, it is assumed that two damaged portions whose areas are the same and whose occurrence positions are different have occurred in the optical member, one damaged portion has occurred at a position where the laser light is transmitted, and the other damaged portion has occurred at a position where the laser light is not transmitted. In such a case, if the damage has occurred at a position where the laser is transmitted, the damage affects the emission of the laser light. Further, if the damage has occurred at a position where the laser light is not transmitted, there is a possibility that the damage does not affect the emission of the laser light.

Therefore, in Embodiment 2, the laser system 1 is provided with the damage degree calculation unit 26 in order to determine the damage in consideration of the effect of the damage of the optical member on the operation of the laser system 1. The laser system 1 calculates the damage degree D from the occurrence position of the damage of the optical member and the area of the damage and determines the damage having occurred in the optical member on the basis of the calculated damage degree D.

Figure 6:
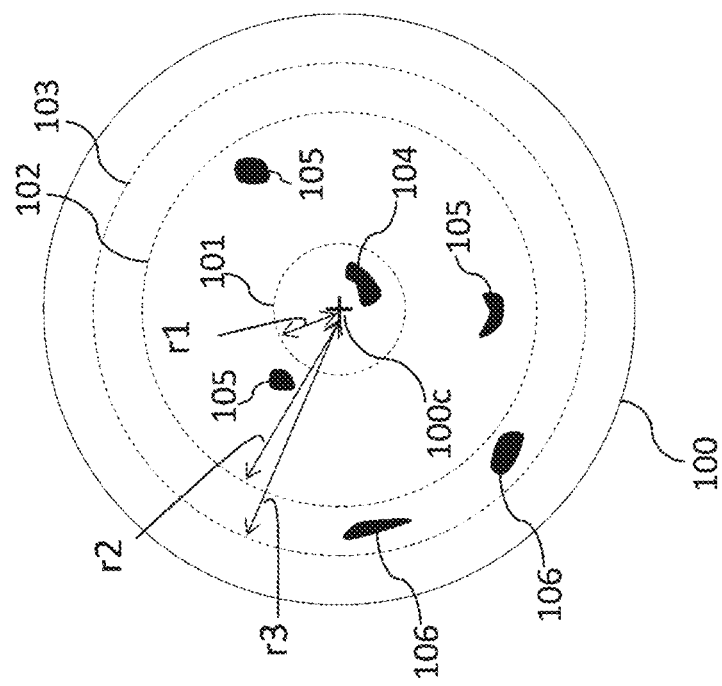
FIG. 6 is a diagram showing a determination region and a damage occurrence status according to Embodiment 2.
Figure 7:
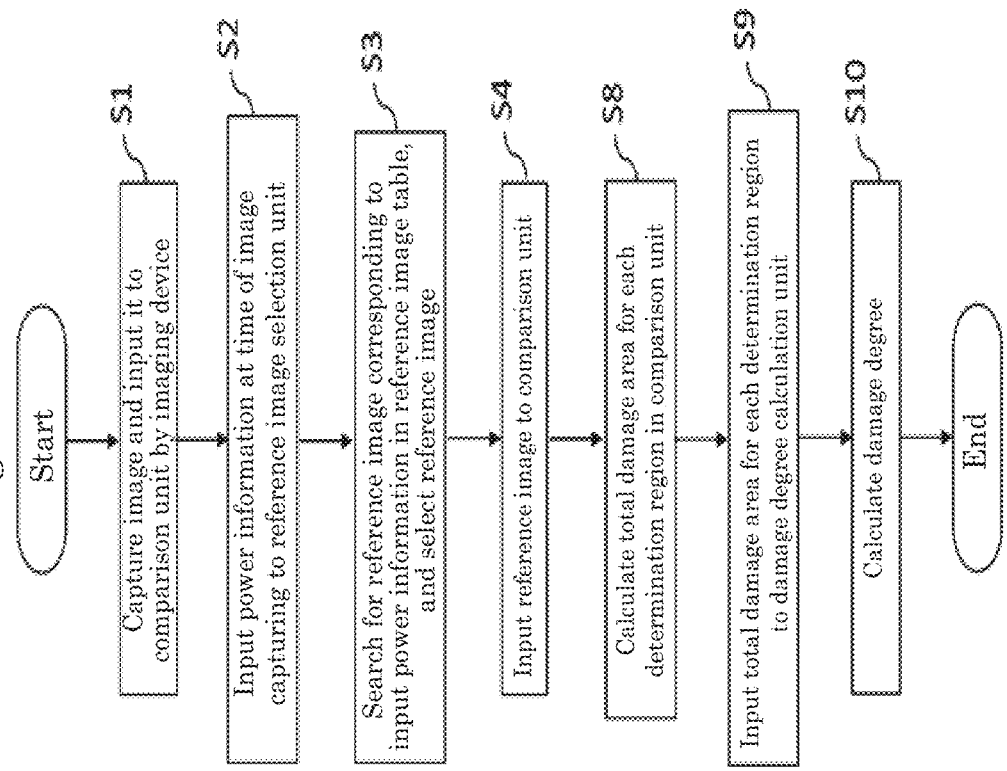
FIG. 7 is a flowchart showing a flow of operations of the laser system according to Embodiment 2.

FIG. 6 is a diagram showing a determination region and a damage occurrence status and showing a result of comparison by the comparison unit 24. The calculation of the damage degree D will be described with reference to FIG. 6. Here, in the laser amplifier 3 provided with a platelike window member having a perfectly circular cross section, which is an optical member, the calculation of the damage degree D based on a captured image of the optical member under a certain power supply condition will be described.

FIG. 6 shows a window member region 100 showing the outline of an optical member. A laser light transmission position center 100c, which is a position at which laser light is transmitted, is shown at the center position of the window member region 100. In addition, a first determination region 101 that is a circle with a radius r1, a second determination region 102 that is a circle with a radius r2, and a third determination region 103 that is a circle with a radius r3 are shown, the circles being centered at the laser light transmission position center 100c. For example, the first determination region 101, the second determination region 102, and the third determination region 103 are set in the comparison unit 24.

The range of each determination region is such that the first determination region 101 is the range inside the circle with the radius r1 ($0 \leq r < r1$), the second determination region 102 is the range excluding the first determination region 101 ($r1 \leq r < r2$) inside the circle with the radius r2, and the third determination region 103 is the range excluding the first determination region 101 and the second determination region 102 ($r2 \leq r < r3$) inside the circle with the radius r3. Note that the number of determination regions is not limited to three, and may be set freely or may be one. As shown in FIG. 6, the window member region 100 may not coincide with the combined three regions of the first determination region 101, the second determination region 102, and the third determination region 103. Further, the shape of the window member region 100 is not limited to a perfect circle shape and can be changed according to the shape of the optical member.

FIG. 6 shows a comparison result by the comparison unit 24. That is, difference information relating to the damage of the optical member detected from the comparison by the comparison unit 24 on the basis of the reference image and the captured image is shown. Here, the difference information includes a damaged portion 104, damaged portions 105, and damaged portions 106. The damage portion 104 is shown inside the first determination region 101, three damaged portions 105 are shown inside the second determination region 102, and two damaged portions 106 are shown inside the third determination region 103.

The comparison unit 24 calculates the total damage area s from the difference information. The total damage area s is obtained by adding the area values of the damaged portions occurring in each determination region and is calculated for each determination region. Specifically, the comparison unit 24 calculates s1 in the first determination region 101, the total damage area s2 in the second determination region 102, and the total damage area s3 in the third determination region 103. The calculated total damage area s is input to the damage degree calculation unit 26. That is, the comparison unit 24 calculates the total damage area s from the difference information included in the determination region, and inputs it to the damage degree calculation unit 26.

The damage degree calculation unit 26 calculates the damage degree D on the basis of the total damage area s input from the comparison unit 24. The damage degree calculation unit 26 also calculates the damage degree D on the basis of a damage coefficient A in each determination region. The damage coefficient A is a numerical value indicating the degree of influence of the damage in each determination region on the operation of the laser system 1 and is set for each determination region. Specifically, a first damage coefficient A1 corresponding to the first determination region, a second damage coefficient A2 corresponding to the second determination region, and a third damage coefficient A3 corresponding to the third determination region are set. Note that the damage coefficient A is a positive number.

The damage degree D is defined as, for example, the sum of the products of the damage coefficient A and the total damage area s in each determination region. The damage degree D is a value indicating that the greater the value, the greater the degree of damage. In this case, the damage degree D is expressed by the following formula (1).

$$\text{Damage degree } D = A1s1 + A2s2 + A3s3 \tag{1}$$

For example, it is considered that the damage coefficient is set to a large value in a region close to the laser light transmission position center 100c and is set to a small value in a region away from the laser light transmission position center 100c.

The damage coefficient will be described with a specific example. Let us consider a case where the magnitude relationship of each total damage area s is $s1 > s2 > s3$ and a case where $s1 < s2 < s3$. Here, it is assumed that the sum ($s1 + s2 + s3$) of the total damage areas s in both cases is equal. At this time, it is clear that the damage degree D is large when the total damage area s1 in the region close to the laser light transmission position center 100c is large. Here, if the damage coefficient is set appropriately so as to have a relationship of $A1 > A2 > A3$, the damage degree D in the former case described above is large.

Further, although the damage degree D expressed by the formula (1) is calculated by arranging three determination regions in the window member region 100, the damage degree D can be defined by a generalized formula (2), where a radius ri is for the i-th determination region from the laser light transmission position center 100c, the damage coefficient in $r_{i-1} \le r < r_i$ is $A_i$, and the total damage area is $s_i$.

$$\text{Damage degree } D = A_1 s_1 + A_2 s_2 + A_3 s_3 + \ldots + A_i s_i. \quad (2)$$

Although the damage coefficient A is set for each determination region, it is not necessary to set the damage coefficient A. When the damage coefficient A is not set, the total damage area in each determination region can be calculated from the difference information included in each determination region, and the damage degree D can be calculated on the basis of a plurality of total damage areas.

As described above, since the comparison unit 24 sets the determination region on the basis of the result of the comparison, calculates the total damage area from the difference information included in the determination region, and the damage degree calculation unit 26 calculates the damage degree D on the basis of the total damage area, it is possible to perform the determination in consideration of the actual damage when the damage in the optical member is determined. For example, when the damage degree D exceeds a predetermined threshold value, it is determined that a damaged portion requiring treatment has occurred.

Further, since the comparison unit 24 sets a plurality of determination regions, calculates the total damage area s in each determination region from the difference information contained in each determination region, and the damage degree calculation unit 26 calculates the damage degree D on the basis of the plurality of total damage areas s, it is possible to determine the damage of the optical member for each determination region when the damage in the optical member is determined.

Further, since the comparison unit 24 sets the damage coefficient A that indicates the degree of influence on the laser system 1 and corresponds to the determination region, and the damage degree calculation unit 26 calculates the damage degree D on the basis of the total damage area s and the damage coefficient A, it is possible to perform a determination in consideration of the degree of influence on the laser system 1 when the damage in the optical member is determined.

Furthermore, the actual damage degree D may vary depending on the intensity distribution of the laser light. For example, depending on whether the intensity distribution of the laser light is what is called in a Gaussian mode or a top-hat mode, even if the same damage occurs at the same position, the actual damage degree differs. Therefore, by setting the determination region and the damage coefficient in accordance with the intensity distribution of the laser light, it is possible to perform the determination in consideration of the actual damage when the damage in the optical member is determined.

Next, the operation of the laser system 1 according to Embodiment 2 will be described with reference to FIG. 7. FIG. 7 is a flowchart showing the operation flow of the laser system 1.

Since the flow from step S1 to step S4 is the same as that in Embodiment 1, the description thereof will be omitted.

In step S4, after the reference image selection unit 21 inputs the selected reference image to the comparison unit 24, the operation of step S8 is performed.

In step S8, the comparison unit 24 calculates the total damage area s for each determination region from the difference information in each determination region. After the comparison unit 24 calculates the total damage area s, the operation of step S9 is performed.

In step S9, the comparison unit 24 inputs the calculated total damage area s to the damage degree calculation unit 26.

In step S10, the damage degree calculation unit 26 calculates the damage degree D on the basis of the total damage area s and the damage coefficient A in each determination region. After damage in the optical member is determined on the basis of the damage degree D, a series of operations of the laser system 1 is terminated.

In the laser system 1 according to Embodiment 2, since the comparison unit 24 sets the determination region on the basis of the result of the comparison, calculates the total damage area from the difference information included in the determination region, and the damage degree calculation unit 26 calculates the damage degree D on the basis of the total damage area, it is possible to perform the determination in consideration of the actual damage when the damage in the optical member is determined.

Embodiment 3

Next, a laser system 1 according to Embodiment 3 will be described with reference to FIG. 8 to FIG. 10.

Figure 8:
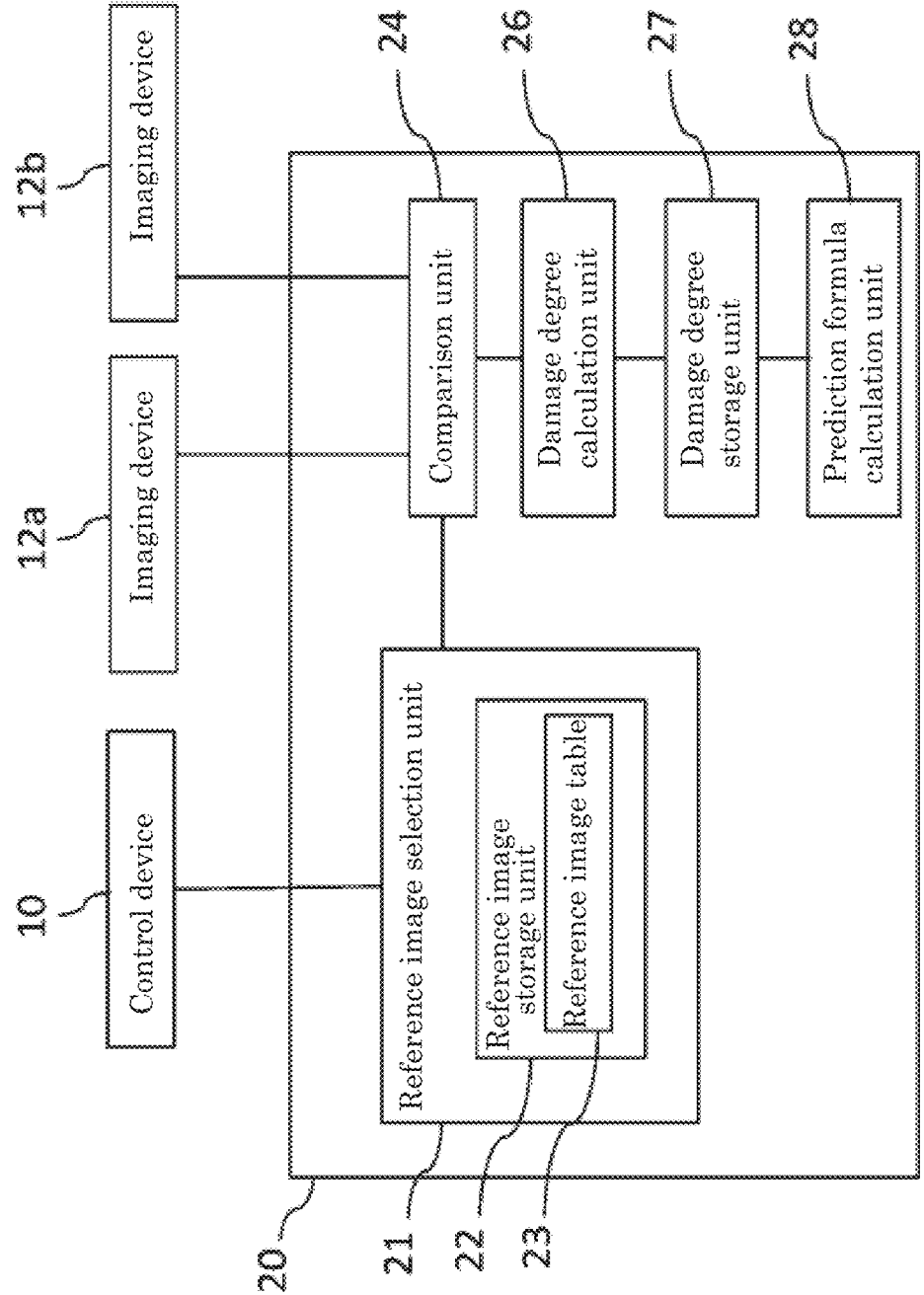
FIG. 8 is a block diagram of an image processing device of a laser system according to Embodiment 3.

FIG. 8 is a block diagram of an image processing device 20 of the laser system 1 according to Embodiment 3. As shown in FIG. 8, the image processing device 20 includes a damage degree storage unit 27 and a prediction formula calculation unit 28 in addition to the image processing device 20 according to Embodiment 2. In the following description, a configuration different from that of Embodiment 1 and Embodiment 2 will be mainly described.

The image processing device 20 according to Embodiment 3 has the same configuration as that of Embodiment 2 relating to the flow until the damage degree calculation unit 26 calculates the damage degree D on the basis of the result of comparison by the comparison unit 24, but differs in that the calculated damage degrees D are accumulated and a prediction formula is calculated from the damage degrees D. The prediction formula is an equation showing a future transition of the damage degree D.

The damage degree calculation unit 26 calculates the damage degree D and stores it in the damage degree storage unit 27. The laser system 1 calculates the damage degree D regularly or irregularly on the basis of a command value input by an operator or a command value input to the laser system 1 through an external device. That is, the damage degree D is stored in the damage degree storage unit 27 over the operating time of the laser system 1. The prediction formula calculation unit 28 calculates a prediction formula on the basis of the damage degrees D stored in the damage degree storage unit 27.

Figure 9:
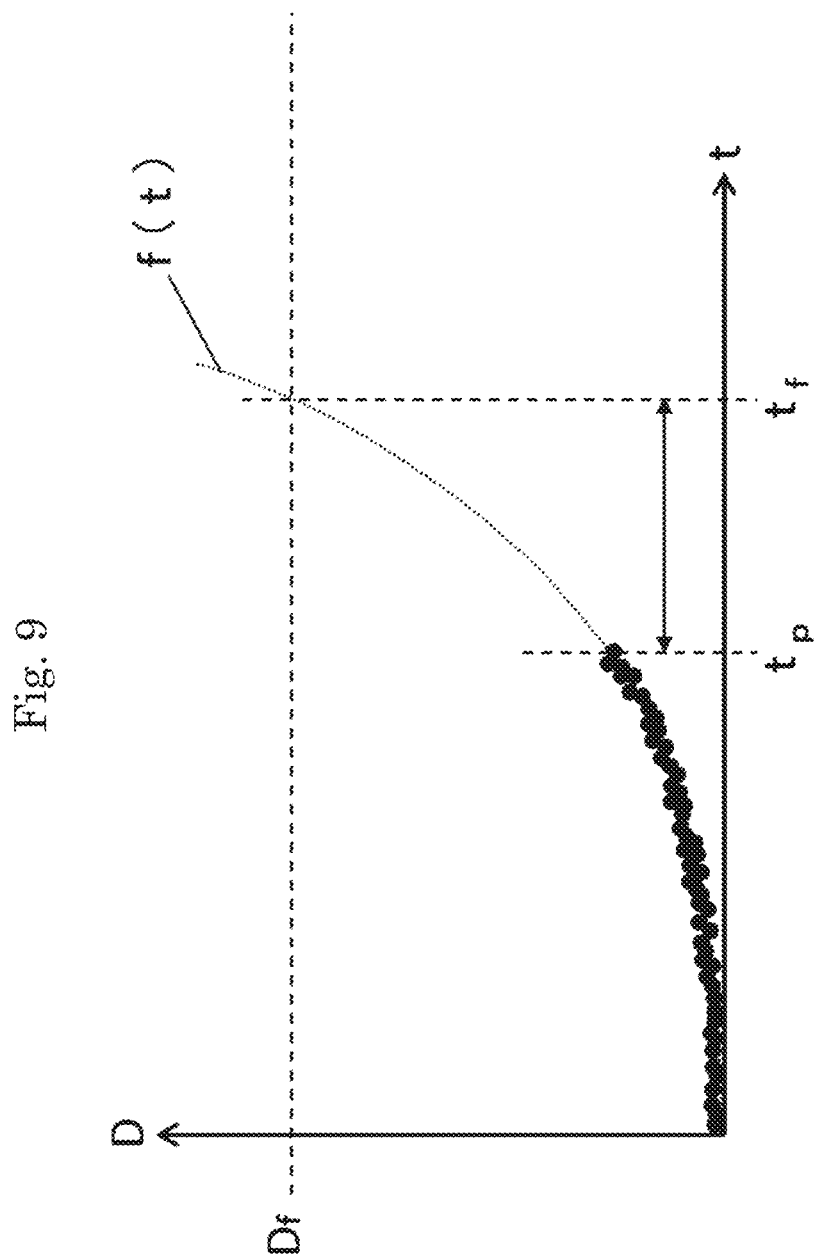
FIG. 9 is a diagram showing a prediction formula of the laser system according to Embodiment 3.
Figure 10:
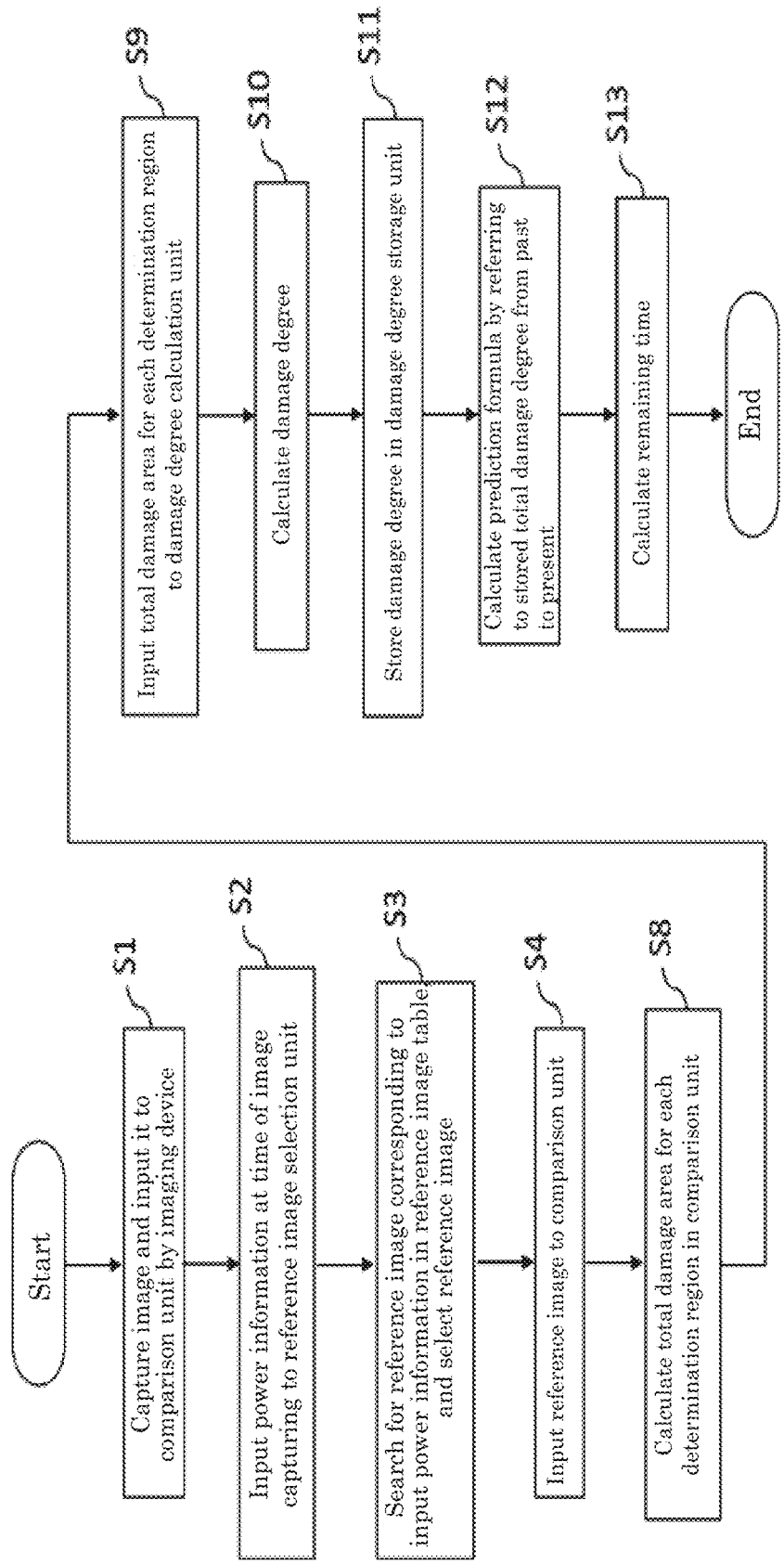
FIG. 10 is a flowchart showing a flow of operations of the laser system according to Embodiment 3.

FIG. 9 is a diagram showing a prediction formula in the laser system 1. The horizontal axis t represents time, and the vertical axis D represents the damage degree D. A plotted curve in the figure shows the damage degrees D stored in the damage degree storage unit 27. As shown in FIG. 9, it can be seen that the optical member is damaged with the operation of the laser system 1, and the value of the damage degree D is increased.

The prediction formula calculation unit 28 calculates a prediction formula f(t) from the change over time in the damage degree D stored in the damage degree storage unit 27. The prediction formula calculation unit 28 refers to all the damage degrees D from the past to the present stored in the damage degree storage unit 27 and calculates a prediction formula. Note that the damage degrees D referred to by the prediction formula calculation unit 28 do not have to be all the damage degrees D from the past to the present and the prediction formula calculation unit may refer to the damage degrees D at certain intervals.

FIG. 9 shows a prediction formula f (t) calculated on the basis of the plotted points of the damage degrees D. The prediction formula f(t) may be calculated by curve-fitting using a least-square method with respect to the change over time in the damage degree stored in the damage degree storage unit 27 or may be calculated using a theoretical formula based on a physical phenomenon such as heat absorption at the damage.

As described above, the prediction formula calculation unit 28 calculates the prediction formula f(t) on the basis of the damage degrees D stored in the damage degree storage unit 27, so that the progress of the damage degree D in the future can be predicted from the prediction formula f(t).

Further, by setting a limit damage degree $D_f$ as the damage degree D of the limit at which the operation of the laser system 1 is stopped, the remaining time until the laser system 1 is stopped can be calculated from the prediction formula f (t).

Specifically, as shown in FIG. 9, $t_f$ can be calculated as the time t at which the limit damage degree $D_f$ is obtained from the prediction formula f(t) calculated on the basis of the damage degree D. By calculating $t_f$, the remaining lifetime information of the optical member can be calculated. That is, the remaining lifetime information of the optical member is the time from the current time $t_p$ to $t_f$, and this time is the remaining time until the laser system 1 stops.

As described above, by calculating the remaining time from the prediction formula f(t), it is possible to avoid a sudden stop of the laser system 1. Further, since the maintenance of the laser system 1 can be planned and performed before the laser system 1 stops, it is possible to reduce the time taken to recover the laser system 1 when the laser system 1 stops.

Next, the operation of the laser system 1 according to Embodiment 3 will be described with reference to FIG. 10. FIG. 10 is a flowchart showing the operation flow of the laser system 1.

Since the flow from step S1 to step S10 is the same as that in Embodiment 2, the description thereof will be omitted.

In step S11, after the damage degree calculation unit 26 calculates the damage degree D in step S10, the calculated damage degree D is stored in the damage degree storage unit 27.

In step S12, the prediction formula calculation unit 28 refers to the damage degrees D from the past to the present stored in the damage degree storage unit 27, and calculates a prediction formula f(t) on the basis of the damage degrees D.

In step S13, on the basis of the prediction formula f(t) calculated by the prediction formula calculation unit 28, the time $t_f$ at which the damage degree is equal to the limit damage degree $D_f$ is calculated, and a remaining time, which is the remaining lifetime information of the optical member, is calculated from the time $t_f$ and the current time $t_p$. When the remaining time is calculated, a series of operations of the laser system 1 ends.

In the laser system 1 according to Embodiment 3, since the image processing device 20 includes the damage degree storage unit 27 for storing the damage degree D calculated by the damage degree calculation unit 26, and the prediction formula calculation unit 28 for calculating the prediction formula f(t) showing a future transition of the damage degree D on the basis of the damage degree D stored in the damage degree storage unit 27, an effect is brought about in that the progress of the damage degree D in the future can be predicted from the prediction formula f(t).

Further, in the laser system 1, by calculating the remaining time from the prediction formula f(t), it is possible to avoid sudden stop of the laser system 1. Further, since the maintenance of the laser system 1 can be planned and performed before the laser system 1 stops, an effect is brought about in that the downtime can be reduced.

Embodiment 4

Next, a laser system 1 according to Embodiment 4 will be described with reference to FIG. 11 to FIG. 14.

Figure 11:
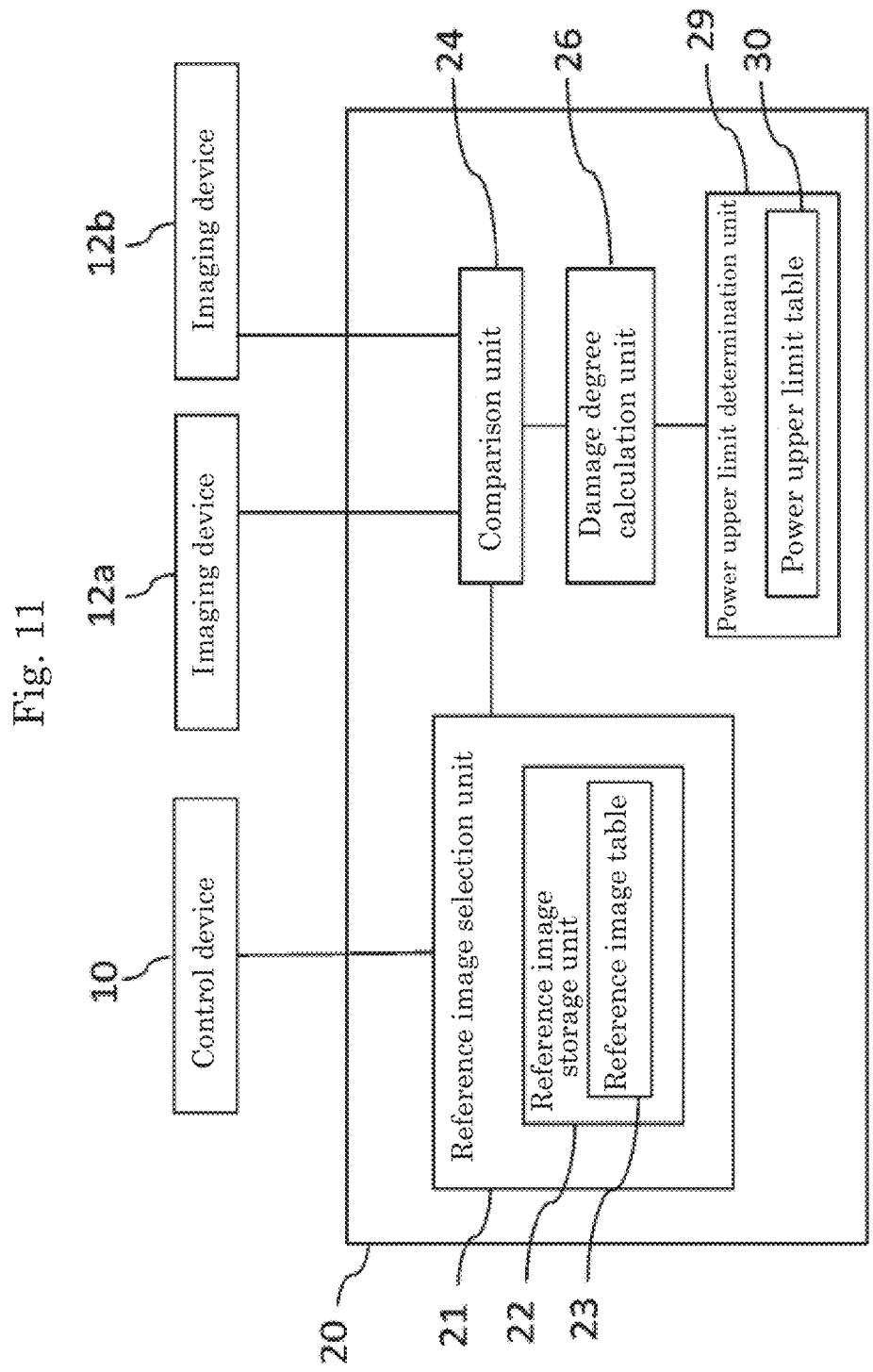
FIG. 11 is a diagram showing a configuration of an image processing device of a laser system according to Embodiment 4.

FIG. 11 is a block diagram of the image processing device 20 of a laser system 1 according to Embodiment 4. As shown in FIG. 11, the image processing device 20 includes a power upper limit determination unit 29 in addition to the image processing device 20 of Embodiment 2. In the following description, a configuration different from those of Embodiment 1 to Embodiment 3 will be mainly described.

The image processing device 20 according to Embodiment 4 has the same configuration as that of Embodiment 2 relating to the flow until the damage degree calculation unit 26 calculates the damage degree D on the basis of the comparison result of the comparison unit 24, but differs in that the power upper limit value $P_m$ is determined on the basis of the calculated damage degree D. The power upper limit value $P_m$ is an upper limit value of power corresponding to the damage degree D at a certain point in time and is an upper limit value of power to be set in order to suppress worsening of the damage of the optical member.

The damage degree calculation unit 26 calculates the damage degree D and inputs it to the power upper limit determination unit 29. The power upper limit determination unit 29 determines the power upper limit value Pm on the basis of the damage degree D.

Figure 12:
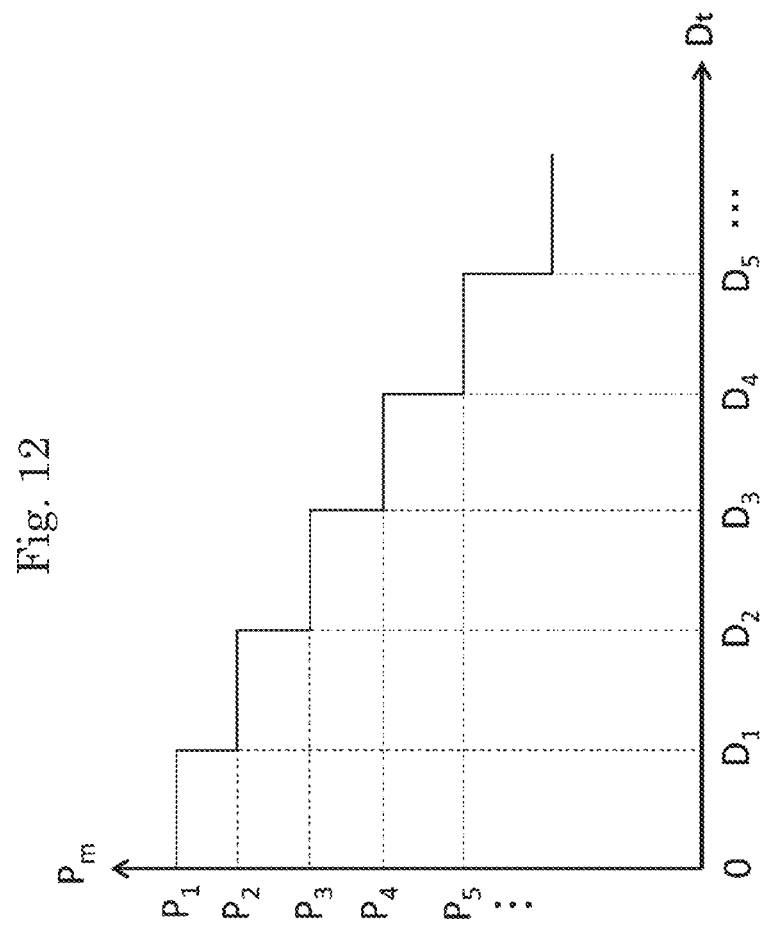
FIG. 12 is a graph showing a relationship between a damage degree threshold value and a power upper limit value according to Embodiment 4.

FIG. 12 is a graph showing a relationship between a damage degree threshold value $D_t$ and the power upper limit value $P_m$. The damage degree threshold value $D_t$ shown on the horizontal axis is a threshold value provided for the damage degree D, and here, $D_1$, $D_2$, $D_3$, $D_4$, and $D_5$ are shown as examples. In addition, FIG. 12 shows $P_1$, $P_2$, $P_3$, $P_4$, and $P_5$ as the power upper limit values Pm shown in the vertical axis. The power upper limit determination unit 29 determines the power upper limit value $P_m$ from the relationship of the power upper limit values Pm set in advance corresponding to the damage degree D. Note that the damage degree threshold value $D_t$ is not limited thereto and may be set appropriately.

Taking FIG. 12 as an example, the damage degree threshold value $D_t$ and the power upper limit value Pm will be described. The damage degree threshold value $D_t$ is the damage degree D of a limit at which the laser system 1 may be operated at a certain power value. For example, if the damage degree D exceeds the damage degree threshold value $D_t$ when the laser system 1 is operated at the power value, the damage degree D may worsen, and therefore it is necessary to lower the power value.

When the damage degree threshold value $D_t$ is between 0 and $D_1$, that is, between $0 \leq D_t < D_1$, the power upper limit value $P_m$ is $P_1$, which is an upper limit value of power to be set in order to suppress further worsening of the damage degree D. Subsequently, the relationship between the damage degree threshold value $D_t$ and the power upper limit value $P_m$ is set sequentially such that the power upper limit value $P_m$ is $P_2$ between $D_1 \leq D_t < D_2$.

Figure 13:
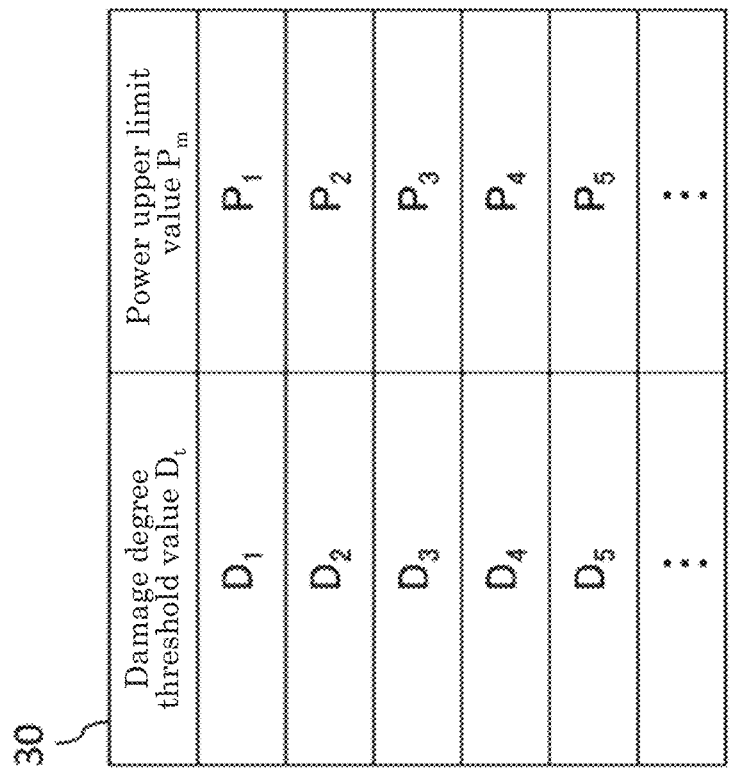
FIG. 13 is a diagram showing a power upper limit table according to Embodiment 4.

The power upper limit determination unit 29 stores a power upper limit table 30 showing a relationship between the damage degree threshold value $D_t$ and the power upper limit value $P_m$. FIG. 13 shows the power limit table 30. The power upper limit determination unit 29 determines the power upper limit value $P_m$ from the damage degree D input from the damage degree calculation unit 26 on the basis of the power upper limit table 30. The power upper limit determination unit 29 inputs the determined power upper limit value Pm to the control device 10, and the control device 10 performs control such that the power does not exceed the power upper limit value $P_m$.

As described above, since the power upper limit determination unit 29 determines the power upper limit value $P_m$ on the basis of the damage degree D, and the control device 10 controls the supply of power so as not to exceed the power upper limit value $P_m$, it is possible to suppress worsening of the damage of the optical member.

Figure 14:
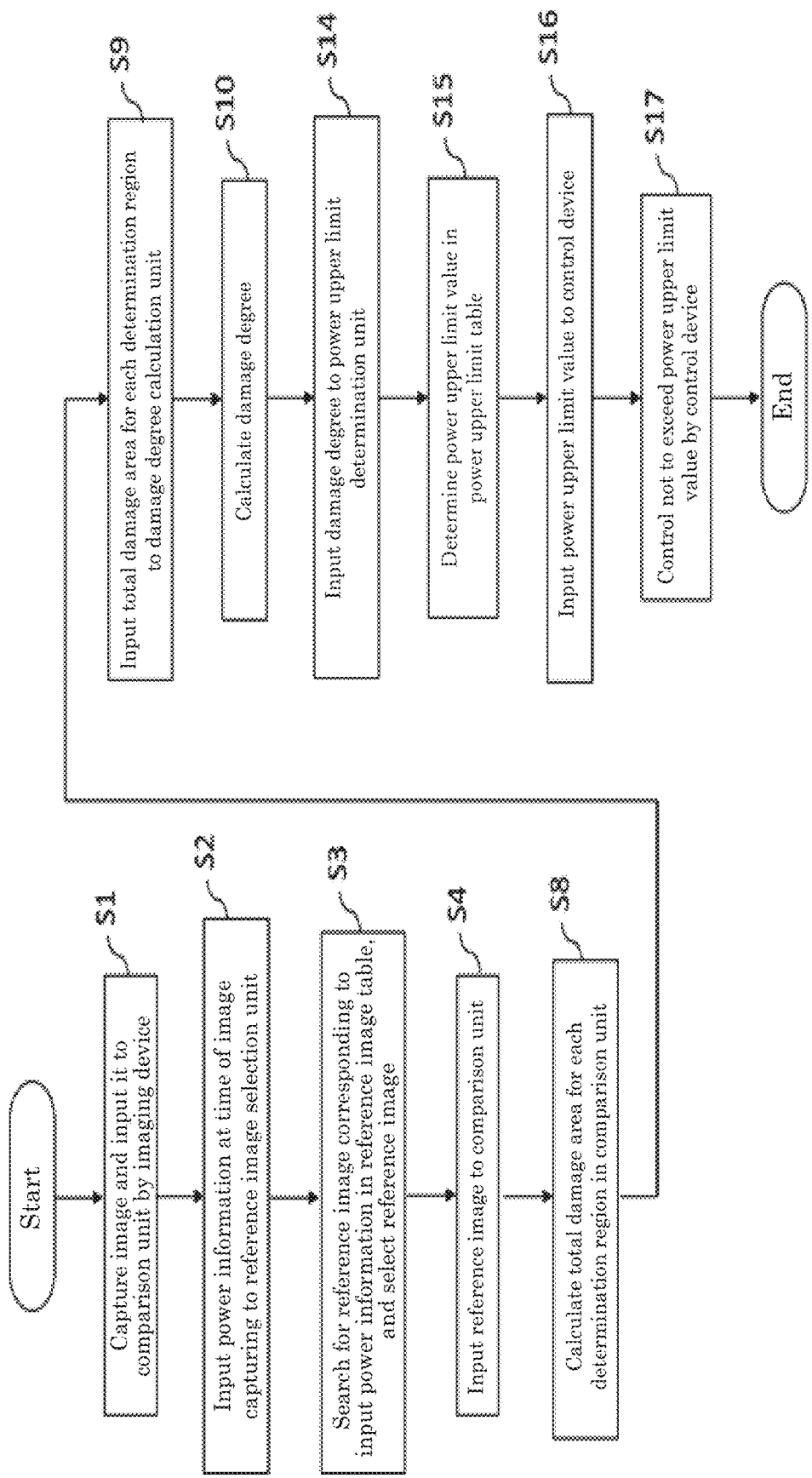
FIG. 14 is a flowchart showing a flow of operations of the laser system according to Embodiment 4.

Next, the operation of the laser system 1 according to Embodiment 4 will be described with reference to FIG. 14. FIG. 14 is a flowchart showing an operation flow of the laser system 1.

Since the flow from step S1 to step S10 is the same as those in Embodiment 2, the description thereof will be omitted.

In step S14, after the damage degree calculation unit 26 calculates the damage degree D in step S10, the damage degree calculation unit 26 inputs the damage degree D to the power upper limit determination unit 29.

In step S15, the power upper limit determination unit 29 determines the power upper limit value $P_m$ from the damage degree D input on the basis of the power upper limit table 30.

In step S16, the power upper limit determination unit 29 inputs the power upper limit value $P_m$ to the control device 10.

In step S17, the control device 10 controls the power so as not to exceed the power upper limit value $P_m$ on the basis of the input power upper limit value $P_m$. As a result, a series of operations of the laser system 1 is completed.

In the laser system 1 according to Embodiment 4, the image processing device 20 is further provided with the power upper limit determination unit 29 that determines the power upper limit value $P_m$, which is the upper limit value of the power, on the basis of the damage degree (D calculated by the damage degree calculation unit 26, and the power upper limit determination unit 29 determines the power upper limit value $P_m$ from the relationship with the power upper limit value Pm set in advance corresponding to the damage degree D, and the control device 10 controls the supply of the power on the basis of the power upper limit value Pm determined by the power upper limit determination unit 29, so that the control device 10 can control the power so as not to exceed the power upper limit value Pm and can suppress worsening of the damage of the optical member.

Embodiment 5

Next, a laser system 1 according to Embodiment 5 will be described with reference to FIG. 15 to FIG. 17.

Figure 15:
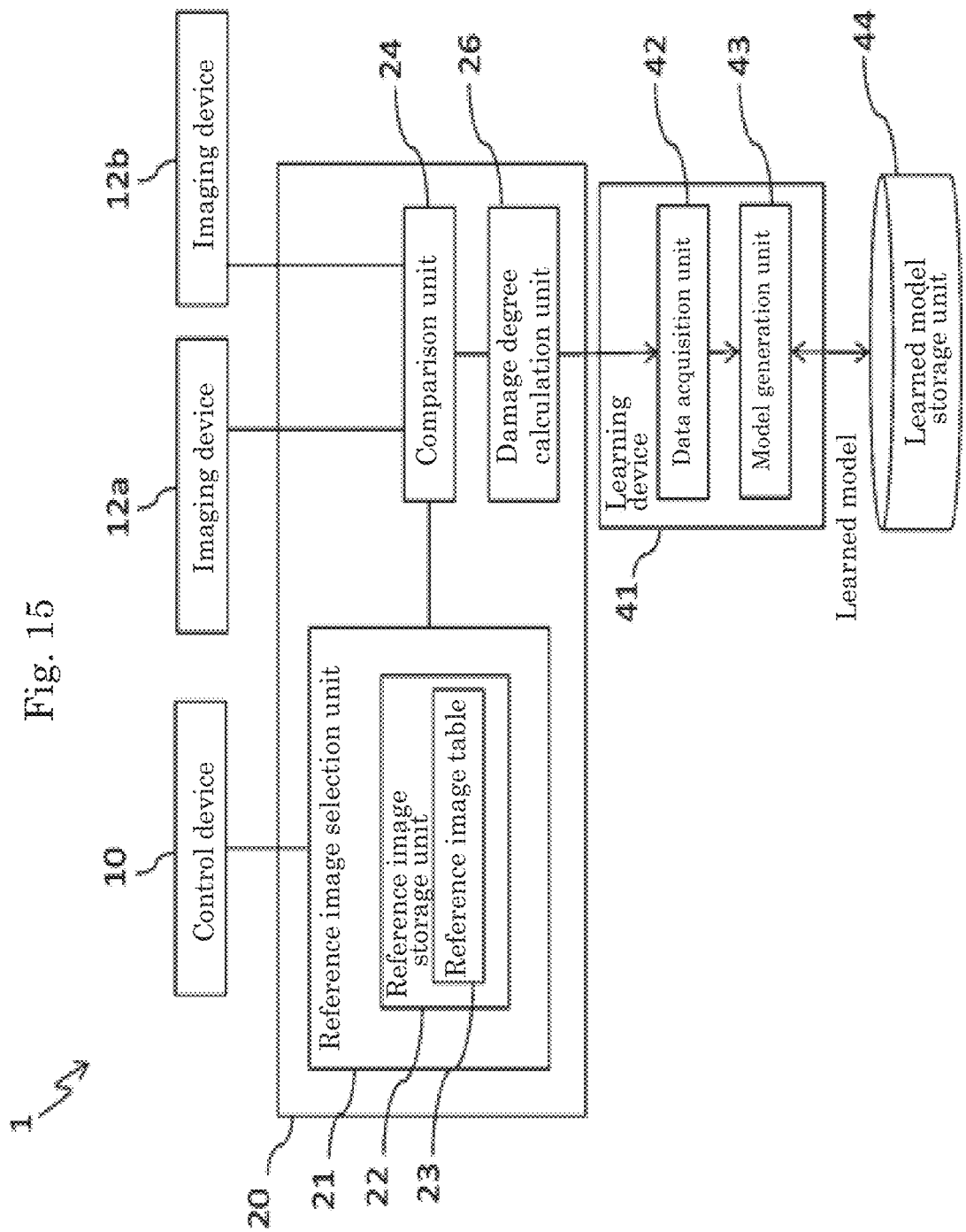
FIG. 15 is a diagram showing a configuration of a learning device according to Embodiment 5.

FIG. 15 is a block diagram of the laser system 1 according to Embodiment 5 and a learning device 41 connected to the laser system 1. As shown in FIG. 15, the learning device 41 is connected to the image processing device 20. Since the image processing device 20 is the same as that of Embodiment 2, the description thereof will be omitted. The learning device 41 will be mainly described below.

As shown in FIG. 15, the learning device 41 includes a data acquisition unit 42, a model generation unit 43, and a learned model storage unit 44.

The data acquisition unit 42 acquires the captured image of the optical member of the laser system 1 and the damage degree D of the optical member as learning data.

The model generation unit 43 learns the damage degree D of an optical member on the basis of learning data created on the basis of a combination of a captured image of the optical member and the damage degree D of the optical member during the operation of the laser system 1, which are outputted from the data acquisition unit 42. That is, a learned model for inferring the optimum damage degree D of an optical member is generated from the captured image of the optical member and the damage degree D of the optical member during the operation of the laser system 1. Here, the learning data is data in which the captured image of the optical member is associated with the damage degree D of the optical member to each other during the operation of the laser system 1.

Note that the learning device 41 is used for learning the damage degree D of an optical member mounted on the laser system 1 but may be a device connected via a network and separate from the laser system 1. Further, the learning device 41 may be incorporated in the laser system 1. Furthermore, the learning device 41 may exist on a cloud server.

Known algorithms such as supervised learning, unsupervised learning and reinforcement learning can be used as the learning algorithm used by the model generation unit 43. As an example, a case where a neural network is applied will be described. The model generation unit 43 learns the damage degree D of the optical member by so-called supervised learning according to, for example, a neural network model. Here, the supervised learning means a technique in which a set of data of an input and a result (label) is given to the learning device 41, thereby characteristics of the learning data is learned and the result is inferred from the input.

A neural network is composed of an input layer consisting of a plurality of neurons, an intermediate layer (hidden layer) consisting of a plurality of neurons, and an output layer consisting of a plurality of neurons. The intermediate layer may be one layer or two or more layers.

Figure 16:
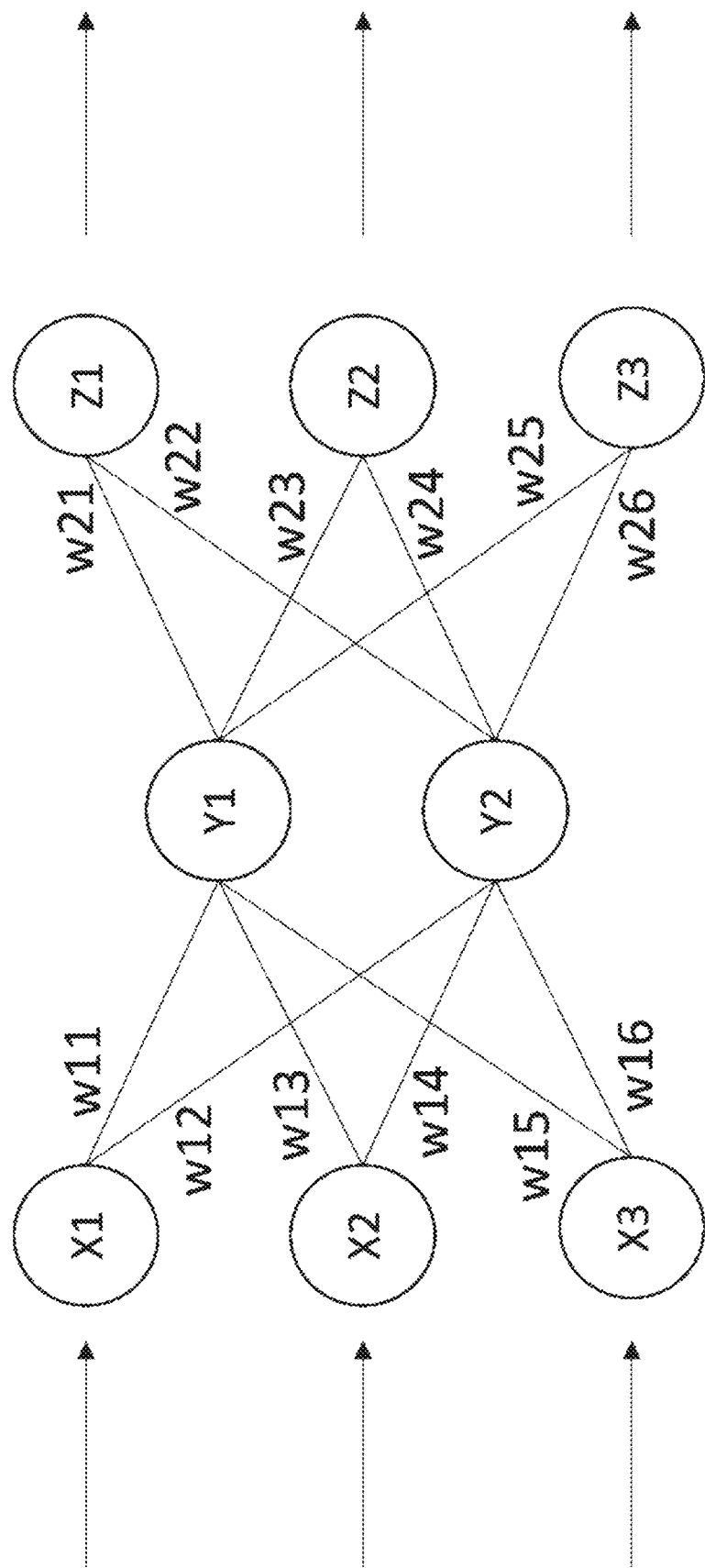
FIG. 16 shows a three-layer neural network.

For example, in the case of a three-layer neural network as shown in FIG. 16, when a plurality of inputs are input to the input layer (X1-X3), the values are multiplied by weights W1 (w11-w16) and input to the intermediate layer (Y1-Y2), and the results are further multiplied by weights W2 (w21-w26) and output from the output layer (Z1-Z3). The output result varies depending on the values of the weights W1 and W2.

In the present application, the neural network learns the damage degree D of an optical member by so-called supervised learning according to learning data created on the basis of a combination of a captured image of the optical member and the damage degree D of the optical member during the operation of the laser system 1, which are acquired by the data acquisition unit 42.

That is, the neural network learns by adjusting the weights W1 and W2 such that the result output from the output layer by inputting the captured image of the optical member during the operation of the laser system 1 to the input layer approaches the damage degree D of the optical member.

The model generation unit 43 generates and outputs the learned model by performing the learning as described above.

The learned model storage unit 44 stores the learned model output from the model generation unit 43.

Next, the processing performed by the learning device 41 will be described with reference to FIG. 17.

Figure 17:
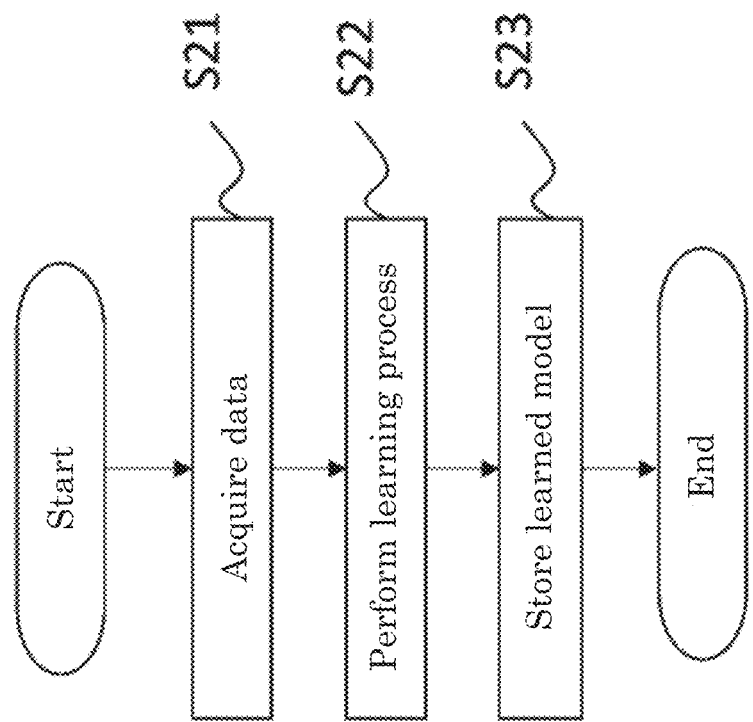
FIG. 17 is a flowchart showing a processing flow of the learning device according to Embodiment 5.

FIG. 17 is a flowchart showing learning processes of the learning device 41.

First, in step S21, the data acquisition unit 42 acquires the captured image of the optical member and the damage degree D of the optical member during the operation of the laser system 1. Although the captured image of the optical member and the damage degree D of the optical member are acquired simultaneously, they may be acquired at different timings as long as they can be input in association with each other.

Next, in step S22, the model generation unit 43 learns the damage degree D of the optical member by so-called supervised learning according to the learning data created on the basis of the combination of the captured image of the optical member and the damage degree D of the optical member during the operation of the laser system 1, which are acquired by the data acquisition unit 42, and generates the learned model.

Then, in step S23, the learned model storage unit 44 stores the learned model generated by the model generation unit 43.

As described above, according to the laser system 1 of Embodiment 5, the learning device 41 includes the data acquisition unit 42, the model generation unit 43, and the learned model storage unit 44, and the data acquisition unit 42 acquires the captured image of the optical member of the laser system 1 and the damage degree D of the optical member as the learning data, and outputs the learning data to the model generation unit 43. The model generation unit 43 learns the damage degree D of the optical member on the basis of the learning data created on the basis of a combination of the captured image of the optical member and the damage degree D of the optical member during the operation of the laser system 1, which are outputted from a data acquisition unit 42. By adopting such a configuration, it is possible to improve the learning accuracy of the damage degree D of the optical member.

Note that the data acquisition unit 42 may acquire the remaining lifetime information of the optical member of the laser system 1 instead of the damage degree D of the optical member of the laser system 1. In this case, the learning data is data in which the captured image of the optical member during the operation of the laser system 1 and the remaining lifetime information of the optical member are associated with each other. In this case, the same configuration as that of the image processing device 20 of Embodiment 3 can be applied to the image processing device 20.

As a result, the learning device 41 includes the data acquisition unit 42, the model generation unit 43, and the learned model storage unit 44, and the data acquisition unit 42 acquires the captured image of the optical member of the laser system 1 and the remaining lifetime information of the optical member as the learning data and outputs the learning data to the model generation unit 43. The model generation unit 43 learns the remaining lifetime information of the optical member on the basis of the learning data created on the basis of a combination of the captured image of the optical member and the remaining lifetime information of the optical member during the operation of the laser system 1, which are output from the data acquisition unit 42. With such a configuration, it is possible to improve the learning accuracy of the remaining lifetime information of the optical member. Note that the processing of learning the remaining lifetime information of the optical member by using the learning device 41 is the same as that in the case of the damage degree D of the optical member, and the description thereof will be omitted.

In the present embodiment, the case where the supervised learning is applied to the learning algorithm used by the model generation unit 43 has been described, but this case is not a limitation. As for the learning algorithm, reinforcement learning, unsupervised learning, semi-supervised learning or the like can be applied in addition to the supervised learning. This is also true in the following Embodiment 6.

Further, the model generation unit 43 may learn the damage degree D of the optical member according to learning data created for a plurality of laser systems 1. Note that the model generation unit 43 may acquire learning data from the plurality of laser systems 1 used in the same area or may learn the damage degree D of the optical member by using learning data collected from the plurality of laser systems 1 operating independently in different areas. It is also possible to add or remove a laser system 1 as an object from which the learning data is collected in the middle. Further, the learning device 41 having learned the damage degree D of an optical member with respect to a certain laser system 1 may be applied to another laser system 1, and the damage degree D of an optical member with respect to another laser system 1 concerned may be re-learned and updated.

As the learning algorithm used in the model generation unit 43, deep learning for learning the extraction of the feature itself may be used, and machine learning may be executed according to other known methods, for example, genetic programming, functional logic programming, a support vector machine, etc.

Embodiment 6

Next, a laser system 1 according to Embodiment 6 will be described with reference to FIG. 18 and FIG. 19.

Figure 18:
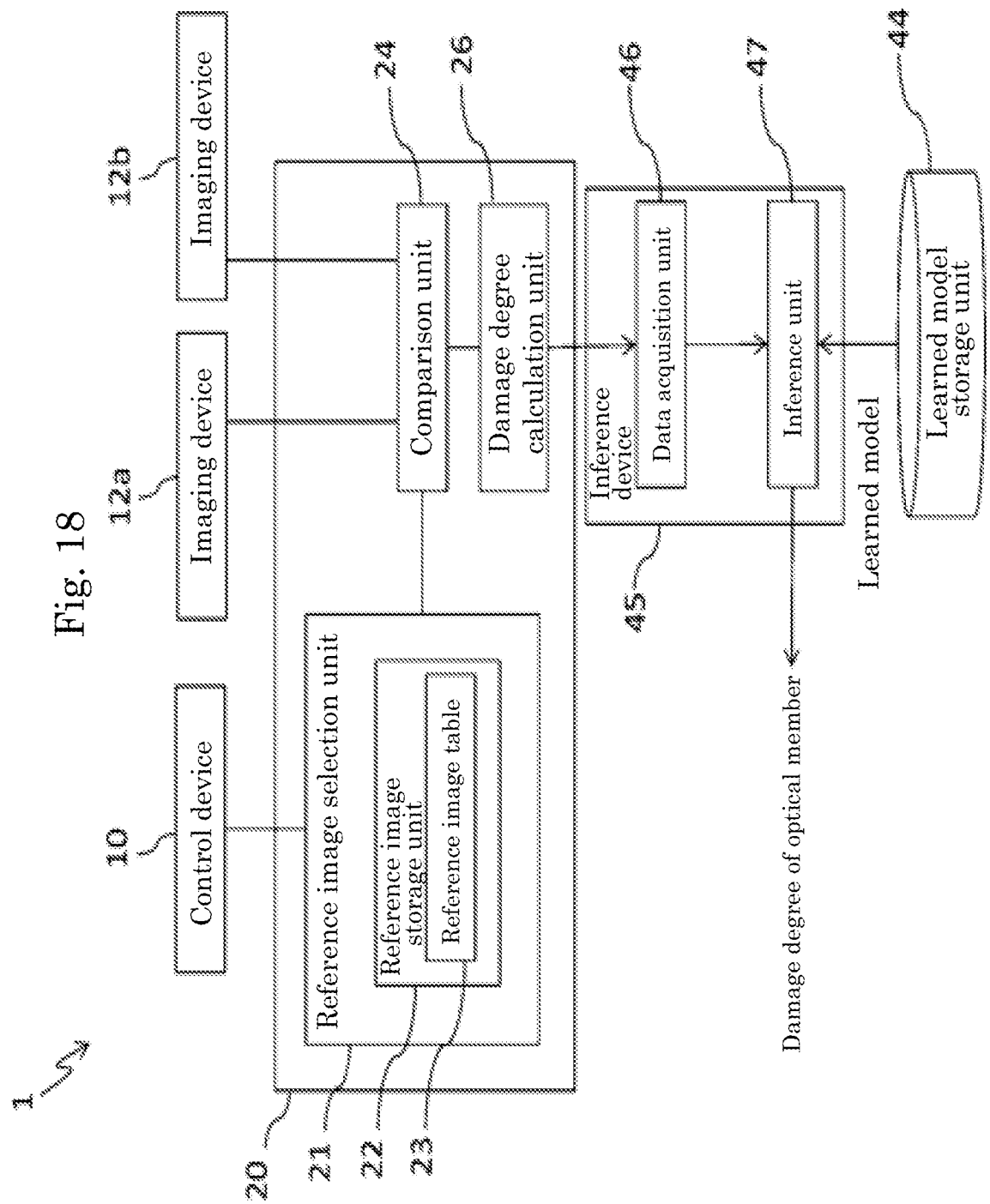
FIG. 18 is a block diagram of an inference device according to Embodiment 6.

FIG. 18 is a block diagram showing a configuration of the laser system 1 according to Embodiment 6 and an inference device 45 connected to the laser system 1. As shown in FIG. 18, the inference device 45 is connected to the image processing device 20. Since the image processing device 20 is the same as that of Embodiment 2, the description thereof will be omitted. Hereinafter, the inference device 45 will be mainly described.

As shown in FIG. 18, the inference device 45 includes a data acquisition unit 46 and an inference unit 47. The data acquisition unit 46 acquires a captured image of an optical member during the operation of the laser system 1 from the image processing device 20. The inference unit 47 infers the damage degree D of the optical member obtained by using the learned model. That is, by inputting the captured image of the optical member during the operation of the laser system 1 acquired by the data acquisition unit 46 to the learned model, the damage degree D of the optical member inferred from the captured image of the optical member during the operation of the laser system 1 can be output.

In the present embodiment, the damage degree D of the optical member is output using the learned model learned by the model generation unit 43 of the laser system 1, but the learned model may be acquired from the outside and the damage degree D of the optical member may be output on the basis of the learned model.

Further, the inference device 45 is used for learning the damage degree D of an optical member mounted on the laser system 1, but may be a device separate from the laser system 1 and connected via a network, for example. Or, the inference device 45 may be built in the laser system 1. Further, the inference device 45 may exist on a cloud server.

Next, processing for obtaining the damage degree D of an optical member by using the inference device 45 will be described with reference to FIG. 19.

First, in step S31, the data acquisition unit 46 acquires a captured image of the optical member during the operation of the laser system 1.

Next, in step S32, the inference unit 47 inputs the captured image of the optical member during the operation of the laser system 1 to a learned model stored in the learned model storage unit 44 to obtain the damage degree D of the optical member.

Then, in step S33, the inference unit 47 outputs the damage degree D of the optical member obtained by the learned model to the laser system 1.

As described above, according to the laser system 1 of Embodiment 6, the inference device 45 includes the data acquisition unit 46 and the inference unit 47, and the data acquisition unit 46 acquires a captured image of the optical member of the laser system 1, and the inference unit 47 infers the damage degree D of the optical member obtained by using the learned model. By adopting such a configuration, the damage degree D of the optical member can be obtained with high accuracy.

Note that the inference unit 47 may infer the remaining lifetime information of the optical member obtained by using the learned model. In this case, the same configuration as that of the image processing device 20 of Embodiment 3 can be applied to the image processing device 20.

Thus, the inference device 45 includes the data acquisition unit 46 and the inference unit 47, and the data acquisition unit 46 acquires a captured image of the optical member of the laser system 1, and the inference unit 47 infers the remaining lifetime information of the optical member obtained by using the learned model. By adopting such a configuration, the remaining lifetime information of the optical member can be obtained with high accuracy. Note that the processing for obtaining the remaining lifetime information of the optical member by using the inference device 45 is the same as that in the case of the damage degree D of the optical member, and the description thereof will be omitted.

Next, an example of the image processing device 20 will be described with reference to FIG. 20. FIG. 20 is a diagram showing a configuration example of a processing circuit of the image processing device 20 according to Embodiment 1. Note that an example of the configuration of the processing circuit of the image processing device 20 is the same as those in Embodiment 2 to Embodiment 6.

Each function of the image processing device 20 can be implemented by a processing circuit. For example, the processing circuit includes at least one processor 51*a* and at least one memory 51*b*. For example, the processing circuit may include at least one dedicated hardware 52.

When the processing circuit includes at least one processor 51*a* and at least one memory 51*b*, each function of the image processing device 20 is implemented by software, firmware, or a combination of software and firmware. At least one of the software and firmware is written as a program. At least one of the software and firmware is stored in at least one memory 51*b*. The at least one processor 51*a* implements the function of the image processing device 20 by reading and executing the program stored in the at least one memory 51*b*. The at least one processor 51*a* is also referred to as a central processing unit (CPU), a central processor, a processing unit, an arithmetic unit, a microprocessor, a microcomputer, or a digital signal processor (DSP). For example, the at least one memory 51*b* may be a non-volatile or volatile semiconductor memory such as a random-access memory (RAM), a read only memory (ROM), a flash memory, an erasable programmable read-only memory (EPROM), an electrically erasable programmable read-only memory (EEPROM), a magnetic disk, a flexible disk, an optical disc, a compact disc, a Mini-Disc, a digital versatile disc (DVD), or the like.

When the processing circuit comprises at least one dedicated hardware 52, the processing circuit may be implemented, for example, by a single circuit, a composite circuit, a programmed processor, a parallel programmed processor, an application specific integrated circuit (ASIC), and a field-programmable gate array (FPGA), or a combination thereof. For example, each function of the image processing device 20 is implemented by a processing circuit. For example, the functions of the image processing device 20 are collectively implemented by a processing circuit.

A part of each function of the image processing device 20 may be implemented by dedicated hardware 52, and other parts may be implemented by software or firmware.

As described above, the processing circuit implements each function of the image processing device 20 by software, firmware, hardware 52, or a combination thereof.

Note that the functions included in the laser system 1, the control device 10, and the imaging devices 12*a* and 12*b* in Embodiment 1 to Embodiment 6 according to the present disclosure can be implemented by the same processing circuit.

Although the embodiments of the present disclosure have been described above, the laser system, the learning device, and the inference device of the present disclosure are not limited to those described in Embodiment 1 to Embodiment 6, which show a part of the contents of the present disclosure. The laser system of the present disclosure may be combined with other known techniques, and without departing from the scope of the present disclosure, it may be combined or partially omitted or modified in the configuration as appropriate.

DESCRIPTION OF REFERENCE NUMERALS AND SIGNS

1: laser system, 2: laser light source, 3: laser amplifier, 4: chamber, 5: discharge electrode, 6: entrance window member, 7: exit window member, 8: laser gas circulation blower, 9: heat exchanger, 10: control device, 11: power source, 12*a*: imaging device, 12*b*: imaging device, 13*a*: illuminating device, 13*b*: illuminating device, 20: image processing device, 21: reference image selection unit, 22: reference image storage unit, 23: reference image table, 24: comparison unit, 25: determination unit, 26: damage degree calculation unit, 27: damage degree storage unit, 28: prediction formula calculation unit, 29: power upper limit determination unit, 30: power upper limit table, 41: learning device, 42: data acquisition unit, 43: model generation unit, 44: learned model storage unit, 45: inference device, 46: data acquisition unit, 47: inference unit, 51*a*: processor, 51*b*: memory, 52: hardware

The invention claimed is:

1. A laser system for amplifying laser light generated from a laser light source and emitting the laser light, the laser system comprising:
an optical element that is provided in an optical path of the laser light and transmits the laser light;

controlling circuitry to control power to be supplied to the laser system;

an imager to capture an image of the optical element; and an image processing circuitry to process the image of the optical element captured by the imager, wherein the image processing circuitry comprises reference image selecting circuitry in which reference images of the optical element corresponding to power information relating to the power are prepared in advance and one of the reference images corresponding to the power information is selected, and comparing circuitry to compare a captured image of the optical element captured by the imager with the reference image selected by the reference image selecting circuitry, the reference image corresponding to the power information at a time of image capturing by the imager.

2. The laser system according to claim 1, wherein the image processing circuitry further comprises determining circuitry to determine damage of the optical element on a basis of difference information indicating damage of the optical element, the difference information being detected from the comparison by the comparing circuitry.

3. The laser system according to claim 1, wherein the image processing circuitry further comprises damage degree calculating circuitry to calculate a damage degree of the optical element on a basis of difference information indicating damage of the optical element, the difference information being detected from the comparison by the comparing circuitry, and the damage degree calculating circuitry calculates the damage degree on a basis of an occurrence position of the damage and an area of the damage that are contained in the difference information.

4. The laser system according to claim 3, wherein the comparing circuitry calculates a total damage area in the difference information included in at least one determination region that is set, and the damage degree calculating circuitry calculates the damage degree on a basis of the total damage area.

5. The laser system according to claim 4, wherein the comparing circuitry sets a plurality of the determination regions and calculates the total damage area in each of the determination regions from the difference information included in each of the determination regions, and the damage degree calculating circuitry calculates the damage degree on a basis of a plurality of the total damage areas.

6. The laser system according to claim 5, wherein the comparing circuitry sets a damage coefficient corresponding to the determination region, the damage coefficient indicating a degree of influence on the laser system, and the damage degree calculating circuitry calculates the damage degree on a basis of the total damage area and the damage coefficient.

7. The laser system according to claim 6, wherein the image processing circuitry further comprises:

damage degree storing circuitry to store the damage degree calculated by the damage degree calculating circuitry; and prediction formula calculating circuitry to calculate a prediction formula indicating a future transition of the damage degree on a basis of the damage degree stored in the damage degree storing circuitry.

8. The laser system according to claim 6, wherein the image processing circuitry further comprises power upper limit determining circuitry to determine a power upper limit value that is an upper limit value of the power on a basis of the damage degree calculated by the damage degree calculating circuitry, and the power upper limit determining circuitry determines the power upper limit value from a relationship with the power upper limit value set in advance corresponding to the damage degree, and the controlling circuitry controls supply of the power on a basis of the power upper limit value determined by the power upper limit determining circuitry.

9. The laser system according to claim 5, wherein the image processing circuitry further comprises:

damage degree storing circuitry to store the damage degree calculated by the damage degree calculating circuitry; and prediction formula calculating circuitry to calculate a prediction formula indicating a future transition of the damage degree on a basis of the damage degree stored in the damage degree storing circuitry.

10. The laser system according to claim 5, wherein the image processing circuitry further comprises power upper limit determining circuitry to determine a power upper limit value that is an upper limit value of the power on a basis of the damage degree calculated by the damage degree calculating circuitry, and the power upper limit determining circuitry determines the power upper limit value from a relationship with the power upper limit value set in advance corresponding to the damage degree, and the controlling circuitry controls supply of the power on a basis of the power upper limit value determined by the power upper limit determining circuitry.

11. The laser system according to claim 4, wherein the comparing circuitry sets a damage coefficient corresponding to the determination region, the damage coefficient indicating a degree of influence on the laser system, and the damage degree calculating circuitry calculates the damage degree on a basis of the total damage area and the damage coefficient.

12. The laser system according to claim 4, wherein the image processing circuitry further comprises:

damage degree storing circuitry to store the damage degree calculated by the damage degree calculating circuitry; and prediction formula calculating circuitry to calculate a prediction formula indicating a future transition of the damage degree on a basis of the damage degree stored in the damage degree storing circuitry.

13. The laser system according to claim 4, wherein the image processing circuitry further comprises power upper limit determining circuitry to determine a power upper limit value that is an upper limit value of the power on a basis of the damage degree calculated by the damage degree calculating circuitry, and the power upper limit determining circuitry determines the power upper limit value from a relationship with the power upper limit value set in advance corresponding to the damage degree, and the controlling circuitry controls supply of the power on a basis of the power upper limit value determined by the power upper limit determining circuitry.

14. The laser system according to claim 3, wherein the image processing circuitry further comprises:
- damage degree storing circuitry to store the damage degree calculated by the damage degree calculating circuitry; and
- prediction formula calculating circuitry to calculate a prediction formula indicating a future transition of the damage degree on a basis of the damage degree stored in the damage degree storing circuitry.

15. The laser system according to claim 14, wherein
the image processing circuitry further comprises power upper limit determining circuitry to determine a power upper limit value that is an upper limit value of the power on a basis of the damage degree calculated by the damage degree calculating circuitry, and
the power upper limit determining circuitry determines the power upper limit value from a relationship with the power upper limit value set in advance corresponding to the damage degree, and
the controlling circuitry controls supply of the power on a basis of the power upper limit value determined by the power upper limit determining circuitry.

16. A learning device comprising:
data acquiring circuitry to acquire learning data containing a captured image of the optical element of the laser system according to claim 14 and remaining lifetime information of the optical element of the laser system; and
model generating circuitry to generate using the learning data a learned model for inferring remaining lifetime information of the optical element from a captured image of the optical element of the laser system.

17. An inference device comprising:
data acquiring circuitry to acquire a captured image of the optical element of the laser system according to claim 14; and
inferring circuitry to output remaining lifetime information of the optical element from the captured image of the optical element input from the data acquiring circuitry, using a learned model for inferring remaining lifetime information of the optical element from the captured image of the optical element.

18. The laser system according to claim 3, wherein
the image processing circuitry further comprises power upper limit determining circuitry to determine a power upper limit value that is an upper limit value of the power on a basis of the damage degree calculated by the damage degree calculating circuitry, and
the power upper limit determining circuitry determines the power upper limit value from a relationship with the power upper limit value set in advance corresponding to the damage degree, and
the controlling circuitry controls supply of the power on a basis of the power upper limit value determined by the power upper limit determining circuitry.

19. A learning device comprising:
data acquiring circuitry to acquire learning data containing a captured image of the optical element of the laser system according to claim 3 and the damage degree of the optical element of the laser system; and
model generating circuitry to generate using the learning data a learned model for inferring the damage degree of the optical element from a captured image of the optical element of the laser system.

20. An inference device comprising:
data acquiring circuitry to acquire a captured image of the optical element of the laser system according to claim 3; and
inferring circuitry to output the damage degree of the optical element from the captured image of the optical element input from the data acquiring circuitry, using a learned model for inferring the damage degree of the optical element from the captured image of the optical element.

* * * * *